United States Patent [19]

Suzuki et al.

[11] Patent Number: 5,508,919
[45] Date of Patent: Apr. 16, 1996

[54] CONTROL SYSTEM AND CONTROL METHOD FOR CONTROLLING POWER STEERING APPARATUS

[75] Inventors: Hidekazu Suzuki, Aichi; Mitsuhiko Harara; Tadao Tanaka, both of Okazaki, all of Japan

[73] Assignee: Mitsubishi Jidosha Kogyo Kabushiki Kaisha, Tokyo, Japan

[21] Appl. No.: 252,573

[22] Filed: Jun. 1, 1994

[30] Foreign Application Priority Data

Jun. 1, 1993 [JP] Japan .................................. 5-130364
Jun. 22, 1993 [JP] Japan .................................. 5-150305

[51] Int. Cl.$^6$ ...................................................... B62D 5/04
[52] U.S. Cl. ........................... 364/424.05; 180/79.1
[58] Field of Search .................... 364/424.05, 424.01, 364/426.03, 571.07; 180/79.1, 140, 141, 142, 143, 248; 74/810.1, 810.2, 388 PS

[56] References Cited

U.S. PATENT DOCUMENTS

| | | | |
|---|---|---|---|
| 4,530,414 | 7/1985 | Fukino et al. | 180/142 |
| 4,834,203 | 5/1989 | Takahashi et al. | 180/79.1 |
| 4,875,540 | 10/1989 | Oshita et al. | 180/79.1 |
| 4,909,343 | 3/1990 | Mouri et al. | 180/142 |
| 5,040,629 | 8/1991 | Matsuoka et al. | 364/424.05 |
| 5,046,572 | 9/1991 | Komatsu | 180/141 |
| 5,053,966 | 10/1991 | Takahashi et al. | 364/424.05 |
| 5,072,803 | 12/1991 | Kilian et al. | 180/141 |
| 5,265,019 | 11/1993 | Harara et al. | 364/424.05 |

FOREIGN PATENT DOCUMENTS

| | | |
|---|---|---|
| 2182576 | 2/1990 | Japan . |
| 2-171385 | 7/1990 | Japan . |
| 2-171384 | 7/1990 | Japan . |
| 3-35145 | 5/1991 | Japan . |
| 6179373 | 6/1994 | Japan . |

*Primary Examiner*—Kevin J. Teska
*Assistant Examiner*—Tan Nguyen

[57] ABSTRACT

A control system and control method for a power steering apparatus includes a vehicle speed sensor for detecting a running speed V of a vehicle and a steering angle sensor for detecting a steering angle ha of the vehicle. It further includes a steering holding degree calculation unit to determine a steering holding coefficient $K_S$ from a steering angular velocity ha', a steering angle changing amount H, and a lateral acceleration $G_Y$. Finally, a fuzzy logic calculation unit is included for setting a target steering assist amount in accordance with a fuzzy logic rule using the vehicle speed V and a product $V \cdot G_Y$ of the vehicle speed V and the lateral acceleration $G_Y$ as input conditions (membership functions). Thereby, a steering assist amount in a steering mechanism of the vehicle is controlled to the target steering assist amount the control system and control method of a power steering apparatus can provide an optimum steering characteristic according to the high speed running condition of the vehicle.

26 Claims, 18 Drawing Sheets

V·G_Y (vehicle speed × lateral acceleration, Gkm/h)

Steering holding coefficient Ks

Vehicle speed 60 km/h
Product 12G km/h of lateral acceleration
(lateral acceleration 0.2G)
Steering holding coefficient 200

High speed running steer holding
(V = 120km/h, 600mR turning)

5,508,919

CONTROL SYSTEM AND CONTROL METHOD FOR CONTROLLING POWER STEERING APPARATUS

BACKGROUND OF THE INVENTION

1. Field of the Invention

This invention relates to a control system for controlling a power steering apparatus which controls the steering assist amount of a steering mechanism of a vehicle, for example, of a type wherein the target assist amount is set in accordance with a fuzzy logic rule.

2. Description of the Related Art

In recent years, power steering apparatuses have varied widely for assisting the force (hereinafter referred to as steering wheel operating force or steering force) for operating a steering wheel. Particularly, hydraulic power steering apparatus which make use of a hydraulic cylinder mechanism to hydraulically assist the steering wheel operating force are popularly employed as such power steering apparatuses. Also electrically operated power steering apparatuses wherein the steering wheel operating force is assisted by an electric motor have been developed.

Such power steering apparatuses as described above allow steering of a vehicle, for which high steering wheel operating force is normally required, such as, for example, in a large size vehicle or a vehicle which employs wide tires or wheels which must be steered, to be performed with a low steering wheel operating force, thereby eliminating the so-called heavy operation of the steering wheel. When the vehicle speed is low such as upon garaging, generally the steering operation is desired to be performed with a lower steering force. On the other hand, when the vehicle is running at a high speed, if the steering operation is very light (sensitive to a low amount of force), then running of the vehicle becomes unstable. Accordingly, in such situations, the steering operation is desired to be heavy (sensitive to a high amount of force). Thus, a vehicle speed responsive power steering apparatus has been developed wherein the steering wheel operation is controlled in response to the speed of the vehicle. Thus, when the vehicle runs at a low speed, the steering assist amount is set to a comparatively high value so as to make the steering wheel operation lighter. Further, when the vehicle runs at a medium or high speed, the steering assist amount is set to a comparatively low value to make the steering wheel operation heavier.

In one such vehicle speed responsive power steering apparatus, a vehicle speed sensor is provided on the vehicle while a valve for adjusting hydraulic oil to be supplied to a power cylinder is provided in a hydraulic system of the hydraulic power steering apparatus. Operation of the valve is electronically controlled in response to a vehicle speed detected by the vehicle speed sensor to adjust the steering assist amount. The vehicle speed responsive power steering apparatus of the type just mentioned is called an electronically controlled power steering apparatus.

FIG. 16 is a schematic view showing construction of a hydraulic pressure control unit for a conventional electronically controlled power steering apparatus. FIG. 17 is a schematic cross sectional view taken along line XVII—XVII in FIG. 16. Finally, FIG. 18 is a schematic cross sectional view taken along line XVIII—XVIII in FIG. 16.

Referring to FIGS. 16 to 18, the numeral 11 indicates an input shaft for receiving steering force from the steering wheel (not shown), which is rotatably supported in a casing 12 by means of bearings. A pinion gear 13 is mounted for relative rotation at a lower end of the input shaft 11 with a bushing or the like (not shown) interposed therebetween. A torsion bar 14 is located in the hollow inside of the input shaft 11. The torsion bar 14 is coupled at an upper end thereof for integral rotation to the input shaft 11 by way of a pin or the like. Further, it is not restrained at a lower end thereof by the input shaft 11.

The pinion gear 13, at the lower end of the input shaft 1, is held in serration coupling engagement with the lower end of the torsion bar 14 so that the steering force inputted to the input shaft 11 may be transmitted to the pinion gear 13 by way of the torsion bar 14. The pinion gear 13 is held in meshing engagement with a rack 15 so that the steering force of the input shaft 11 may be transmitted to the rack 15 by way of the pinion gear 13 to move the rack 15 in its axial direction (in a direction perpendicular to the plane of FIG. 16) to steer wheels of the vehicle (not shown).

In the casing 12, a rotary valve 16 is disposed between the input shaft 11 and the pinion gear 13. The rotary valve 16 is opened and closed in response to a difference in phase between the input shaft 11 and the pinion gear 13. The rotary valve 16 is connected with a hydraulic oil supply tube 18 of an externally provided oil pump 17 and a hydraulic oil discharge tube 20 of an oil reservoir 19. On the other hand, the numeral 21 indicates a power steering hydraulic cylinder, wherein a piston 23 is supported to be movable in an axial direction in a hollow cylinder 22 provided on a predetermined member on the vehicle body side. A piston shaft 24 of the piston 23 is mounted halfway on the rack 15. The piston 23 partitions the inside of the cylinder 22 into two parts to form right and left oil chambers 25 and 26.

Therefore, when steering force is inputted to the input shaft 11, the input shaft 11 is rigid and presents little distortion, but the torsion bar 14 transmits the steering force to the pinion gear 13 while presenting some distortion. Consequently, the pinion gear [3 presents a difference in phase with respect to the input shaft 11 towards the steering side, and the rotary valve 16 is driven according to the difference in phase. The rotary valve 16 is opened and closed so that hydraulic oil is supplied from the oil pump 17 through the hydraulic oil supply tube 18 to the right and left oil chambers 25 and 26 of the hydraulic cylinder 22 to provide the rack 15 with a steering assist force, producing required steering assist force in the steering direction.

Further in the casing 12, a plurality of reactive force plungers 27 for providing, upon steering, steering reactive force to increase the steering force (that is, steering reaction) are provided on an outer periphery of a lower portion of the input shaft 11 such that they surround the outer periphery of the input shaft 11. The reactive force plungers 27 receive hydraulic oil supplied thereto under the control of a hydraulic pressure control valve 28 to restrain the input shaft 11 to provide steering reactive force in response to the hydraulic pressure.

Specifically, four reactive force plungers 27 are provided at equal intervals in the casing 12 so as to surround the outer periphery of the input shaft 11 and, at its outer end side, chambers 29 are formed and return orifices 30 are provided. On the other hand, the hydraulic pressure control valve 18 is provided in the casing 12 laterally adjacent and parallel to the input shaft 11. In the hydraulic pressure control valve 28, a spool 31 is provided to be movable in a vertical direction in the casing 12, which is biased downward by a spring 32 provided at an upper part. A solenoid 33 is provided on an outer periphery of lower part of the spool 31 so that the solenoid 33 is energized to exert upward axial force to the spool 31.

The spool 31 has a pair of oil passages 34 and 35 communicated with the hydraulic oil discharge tube 20 of the oil reservoir 19, an annular oil passage 36 for communicating with the hydraulic oil supply tube 18 of the oil pump 17, and an annular oil passage 38 for communicating with the chamber 29 of the reactive force plunger 27 by way of a hydraulic supply/discharge tube 37, and an oil passage 39 for communicating the annular oil passages 36 and 38 with each other. Therefore, normally, when the solenoid 33 is unenergized, the spool 31 is at its downward position, and the hydraulic oil supply tube 18 and the annular oil passage 36 communicate with each other. As a result, hydraulic oil supplied to the hydraulic pressure control valve 28 through the hydraulic oil supply tube 18 is supplied to the chamber 29 of the reactive force plunger 27 from the annular oil passage 36 through the oil passage 39 and the annular oil passage 38. On the other hand, when the solenoid 33 is energized, the spool 31 is at its upward position, and the hydraulic oil supply tube and the annular oil passage 36 do not communicate with each other. Therefore, hydraulic oil supplied from the oil pump 17 through the hydraulic oil supply tube 18 to the hydraulic pressure control valve 28 is not supplied to the chamber 29 of the reactive force plunger 27.

Thus, current applied to the solenoid 33 can be adjusted to control steering assist characteristics. Further, a control unit (CU) 40 for controlling the solenoid 33 is connected with a vehicle speed sensor 41, an engine speed sensor 42, and the like so that the control unit 40 sets the current applied to the solenoid 33 in response to output signals from these sensors to control the solenoid 33.

Upon steering, for example, while the vehicle stops or is running at a low speed, maximum current is supplied to the solenoid 33. Consequently, the spool 31 is moved upwardly to its highest position in which the annular oil passage 36 is not communicated with the oil pump 17 and supply of oil to the chambers 29 of the reactive force plungers 27 is stopped. Consequently, the reactive force plungers 27 do not restrain the input shaft 11, and steering can be performed with light-force.

On the other hand, for example, while the vehicle is running at a medium or high speed, the current supply to the solenoid 33 is decreased in response to an increase of the vehicle speed. Consequently, when the steering wheel is at its neutral position, the axial force of the spool 31 decreases as the current decreases. Further, as the axial force decreases, the spool 31 is moved down so that the annular oil passage 36 is communicated with the hydraulic oil supply tube 18 of the oil pump 17 to allow oil to be supplied to the chambers 29 of the reactive force plungers 27. In this condition, the reactive force plungers 27 restrain the input shaft to hold the steering wheel at its neutral position. Then, if the steering wheel is moved a little from the neutral position, then the output of the oil pump 17 attempts to rise. In this instance, the discharging pressure of the oil pump 17 acts upon the chambers 29 of the reactive force plungers 27 almost without being controlled by the hydraulic pressure control valve 28. Accordingly, in the vicinity of the neutral position of the steering wheel, the steering force is increased and a sufficient response of the steering wheel at the neutral position is obtained. This results in a feeling of stability of the steering wheel in the neutral position.

Upon steering while the vehicle is running at a medium or high speed, the output of the oil pump 17 rises, within an ordinary steering range, to increase the steering assist amount in response to steering of the steering wheel, that is, in response to an increase of the steering force. Meanwhile, the discharging pressure of the oil pump 17 acts upon the chambers 29 of the reactive force plungers 27 while being controlled by the hydraulic pressure control valve 28. Accordingly, the reactive force plungers act to restrain the input shaft 11 to increase the steering response (steering force).

As a result, upon steering when the vehicle runs at a medium or high speed, the steering force is increased by an amount corresponding to the action of the reactive force plungers 27 as compared with the steering force acting upon steering when the vehicle stops or is running at a low speed. In short, the steering response is increased and a stable steering feeling is obtained. Particularly, when the current supply to the solenoid 33 is decreased in response to an increase of the vehicle speed, the steering assist amount decreases and the steering force (steering response) increases, and consequently, a more stable steering feeling can be obtained.

The control unit 40 for controlling the solenoid 38 is connected with the vehicle speed sensor 41 and the engine speed sensor 42 so that when trouble with a detection circuit is detected from vehicle speed information, an engine speed signal or the like, the solenoid 33 is turned off to effect fail-safe control.

Another consideration is that the required steering force characteristics actually vary depending upon a running condition of the vehicle, that is, whether the vehicle is running straightforward or along a curve, or whether the vehicle is being accelerated or braked. However, conventional electronically controlled power steering apparatuses have not been successful in always providing an optimum steering feeling since they merely control the steering force in response to the speed of the vehicle as described above.

For example, to assure steering stability in high speed running condition of the vehicle, the steering force characteristic is desired to present a somewhat heavy steering force with a decreased steering assist amount. However, in some cases, light steering with an increased steering assist amount may be advantageous for the driver even when the vehicle is running at a high speed.

That is, on a moderate and long curve with a large curvature or an entrance and exit of an expressway, the vehicle is required to hold the steering wheel at an appropriate steering angle according to the curvature of the road. In this case, if the steering assist amount of the vehicle is set to a small value and the steering force is somewhat heavy, the driver is required to use a high steering force (steering holding force), which is a heavy burden to the driver.

In addition to the electronically controlled power steering apparatus described above, several power steering apparatus have been proposed including a power steering apparatus disclosed in Japanese Patent Laid-open Publication 2-171384 wherein the steering assist amount is varied in accordance with a fuzzy logic rule from a steering direction signal of the steering wheel and a height signal of the vehicle. Another power steering apparatus is disclosed in Japanese Patent Laid-open Publication 2-171385 wherein the steering assist amount is varied in accordance with a fuzzy logic rule from a steering direction signal of the steering wheel and a temperature signal of the vehicle.

However, also those power steering apparatuses fail to control the steering assist-amount for the steering wheel so as to provide an optimum steering characteristic in response to a running condition of the vehicle and particularly do not always provide an optimum steering feeling, as described above, when the vehicle is running at a high speed on a moderate and long curve with a large curvature where the steering wheel must be held at a certain steering angle.

The present applicant has already applied for a patent on a fuzzy logic control type electronically controlled power steering apparatus which solves the above problems as Japanese Patent Application 4-334617 (filed in the U.S. on Dec. 15, 1992).

This fuzzy logic control type electronically controlled power steering apparatus has a target steering assist amount setting device for setting a target steering assist amount during electronic control, which sets the target steering assist amount in accordance with a fuzzy logic rule using the running speed and the level of a steering holding condition in response to the steering angle as input conditions. Specifically, the target steering assist amount setting device uses a first membership function for evaluating the running speed of the vehicle and a second membership function for evaluating the level of the steering holding condition in response to the steering angle to set the target assist amount in accordance with a fuzzy logic rule wherein the target assist amount is increased as the level of the steering holding condition increases. The level of the steering holding condition is determined from the vehicle speed, the steering angle, and the number of times the steering angular velocity changes in a unit time.

However, this fuzzy logic control type electronically controlled power steering apparatus fails to obtain a sufficient ease of steering when the vehicle runs at a high speed. That, is, in the fuzzy logic control type electronically controlled power steering apparatus described previously, the steering angle is applied as one of the factors for setting the level of the steering holding condition, a steering holding adaptation (level of the steering holding condition) is increased as an absolute value |ha| of the steering angle increases from 0, and the adaptation is a fixed value of 1 at 20 degrees. Therefore, as described above, when the vehicle is running on a moderate and long curve with a large curvature of an expressway, the steering wheel is steered at a steering angle according to the curvature of the road, and the steering assist amount of the vehicle can be increased to make the steering force lighter to some extent. However, when the vehicle is running on a road with a cant (inclination in width direction of the road), the absolute value |ha| of steering angle is about 1 to 3 degrees, and the steering holding adaption is small. As a result, the steering assist amount of the vehicle is small and the steering force is heavy. Thus, the driver is required to use a high amount of steering (steering holding) force, which is a heavy burden to the driver.

To eliminate such problems, it is considered to use steering angular velocity to detect the steering holding condition as described in Japanese Patent Publication 3-35145 (USP 4530414, EP 90294).

In this prior art, a case where the steering wheel is turned to cause the vehicle to be released from a straightforward running and the steering angular velocity decreases to below a predetermined value is determined as a steering holding condition, and control for steering holding is made. Since the steering holding condition is determined from a low steering angular velocity, influence of the vehicle speed on the determination of the steering holding condition can be eliminated.

However, in this method, even when the driver slowly turns the steering wheel, a steering holding condition may be determined from the low steering angular velocity, and an appropriate assist amount for steering cannot be set.

Therefore, all object of the present invention is to provide a control system and control method for controlling a power steering apparatus which appropriately detects the steering holding condition and provides an optimum steering characteristic.

Further, the above-described fuzzy logic control type electronically controlled power steering apparatus was not able to obtain a sufficient stability of steering during high speed running of the vehicle. That is, in the above electronically controlled power steering apparatus, the number of changing times of steering angular velocity in a unit time is applied as one of the factors for setting the level of the steering holding condition so that a steering holding adaptation (level of steering holding condition) is a fixed value of 1 when the number of changing times is 0 to 2, decreases as the number of changing times increases from 2, and is a fixed value of 0 at the number of changing times of 3. Specifically, the steering angular velocity is determined from the steering angle detected by the steering angle sensor, a determination is made as to the steering angular velocity is in which of the three regions, a steering holding region, a left steering region, and a right steering region, and the number of times of phenomenon where the steering angular velocity changes to another region in 4 seconds is counted. Therefore, as described above, when the vehicle is running on a moderate and long curve with a large curvature of an expressway, the steering wheel is held at a steering angle according to the curvature, the number of times the steering angular velocity changes in 4 seconds is 0 and the adaptation is 1, and the steering assist amount of the vehicle is increased to decrease the steering force to some extent.

From such a steering holding condition while the vehicle is running at a high speed, when the driver steers the steering wheel by some amount for changing the lanes or the like, the steering force characteristic is desired to present a somewhat, heavy steering force to prevent oversteering. In the above power steering apparatus, the steering assist amount is increased and the steering force is made somewhat light in the steering holding condition during high speed running. When the steering wheel is steered by a predetermined amount for changing lanes or the like, the steering adaptation is decreased because the number of times that the steering angular velocity changes, and the steering assist amount is decreased to make steering heavier. However, in this power steering apparatus, the number of times that the steering angular velocity changes, must be counted at least for 4 seconds to decrease the steering holding adaptation, resulting in poor response. That is, when the driver momentarily operates the steering wheel to dodge a disturbance on the expressway or the like, the steering assist amount cannot be quickly decreased to make steering heavier. This is because this would result in unstable steering of the vehicle.

It is a primary object of the present invention to provide a control system and control method for controlling a power steering apparatus by which an optimum steering characteristic can be obtained in response to a running condition of the vehicle, eliminating the problems described above.

SUMMARY OF THE INVENTION

In accordance with the present invention which attains the above object, there is provided a control system for a power steering apparatus which controls a steering assist amount of a steering mechanism of a vehicle to a target steering assist amount, comprising steering angle detection means for detecting a steering angle of the steering mechanism, steering annular velocity detection means for detecting a steering angular velocity of the steering mechanism, and a controller for setting the target steering assist amount to a greater value when the steering angular velocity is smaller than a predetermined value and an integrated amount of changes of the steering angle, in a unit time, is smaller than a predetermined value.

Therefore, by detecting that the steering annular velocity is smaller than the predetermined value, influence of the vehicle speed on the determination of a steering holding condition can be minimized. Further, by detecting that the integrated amount of steering angle changes in a predetermined time is smaller than a predetermined value, misjudgment of a condition where the driver slowly operates the steering wheel can be prevented. This thereby enhances the detection accuracy of the steering holding condition and the steering characteristic in the steering holding condition is controlled to an optimum state. As a result, in the steering holding condition when the vehicle is running at a high speed, a sufficient stability and optimum steering characteristics can be obtained.

In the control system for a power steering apparatus of the present invention, the controller increases a steering holding coefficient every time it is detected that the steering angular velocity is smaller than a predetermined value and the integrated amount of changes of the steering angle in a predetermined time is smaller than a predetermined value so that the target steering assist amount is set to a greater value in response to an increase in the steering holding coefficient.

Further, the control system for a power steering apparatus of the present invention has a lateral acceleration detection device for determining (detecting or estimating) a lateral acceleration acting upon the vehicle, and the controller decreases the steering holding coefficient when it is detected that the lateral acceleration is greater than a preset value and the steering angular velocity is greater than a predetermined value.

Therefore, since the target steering assist amount is increased in response to an increase in the steering holding coefficient, the steering becomes lighter and easy to operate when the vehicle is in a steering holding condition, running, for example, on a cant road.

Further, in the control system for a power steering apparatus of the present invention, the controller increases the steering holding coefficient by adding a preset value to the steering holding coefficient every time it is detected that the steering angular velocity is smaller than a specified value and the integrated amount of changes of the steering angle in a unit time is smaller than a predetermined value. Further, it decreases the steering holding coefficient by subtracting a value greater than the preset value from the steering holding coefficient every time it is detected that the lateral acceleration is greater than a predetermined value and the steering angular velocity is greater than a predetermined value.

Therefore, the response characteristic where the steering holding condition is released and the steering holding coefficient is decreased can be enhanced over the response characteristic where the steering holding condition is maintained and the steering holding coefficient is increased, thereby increasing the steering force when the vehicle is released from the steering holding condition.

In the control system for a power steering apparatus of the present invention, the controller generates a steering holding release coefficient which decreases in response to an increase in the steering angular velocity, and the steering holding release coefficient is used as the steering holding coefficient when the steering holding release coefficient, is smaller than the steering holding coefficient.

Therefore, when the vehicle is in the steering holding condition, the steering assist amount is gradually increased to make steering lighter and the steering operability is improved. Further, in the steering holding release condition, the steering assist amount is momentarily decreased to make steering momentarily heavier to improve the steering stability and obtain an optimum steering characteristic.

As a preferred embodiment of the control system for a power steering apparatus of the present invention, the controller divides a predetermined value by the square of the steering angular velocity to calculate the steering holding release coefficient.

Further, the controller determines the steering holding release coefficient by a function map for the steering angular velocity.

Further, the control system for a power steering apparatus of the present invention has a vehicle speed detection device for detecting a vehicle speed, and the controller sets the target steering assist amount in accordance with a fuzzy logic rule where the steering assist amount is decreased as the vehicle speed increases and in accordance with a fuzzy logic rule where the steering assist amount is increased as the steering holding coefficient increases.

The control system for a power steering apparatus of the present, invention has a vehicle speed detection device for detecting a vehicle speed, and a lateral acceleration detection device for determining (detecting or estimating) a lateral acceleration acting upon the vehicle. The controller calculates a product of the vehicle speed and the lateral acceleration, and sets the target steering assist amount in accordance with a fuzzy logic rule where the steering assist amount is decreased as the product increases, and a fuzzy logic rule where the steering assist amount is increased as the steering holding coefficient increases.

A control method for a power steering apparatus of the present invention for controlling a steering assist amount of a steering mechanism of a vehicle to a target steering assist amount, is characterized in that an integrated amount of change of a detected steering angle of the steering mechanism, in a predetermined time, is generated in response to the steering angle. Further, a target steering assist amount is set to a greater value when it is detected that a steering angular velocity of the steering mechanism is smaller than a predetermined value and the integrated amount of change is smaller than a predetermined value.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENT

An electronically controlled power steering apparatus as a first embodiment of the present invention will be described in detail with reference to the drawings.

The electronically controlled power steering apparatus of the present embodiment is used to control the hydraulic pressure control unit for power steering in accordance with the fuzzy logic rule, which has a mechanical section (hardware construction) substantially similar to that of the conventional electronically controlled power steering apparatus described hereinabove, and accordingly, the mechanical section will be described briefly below.

Figure 1:
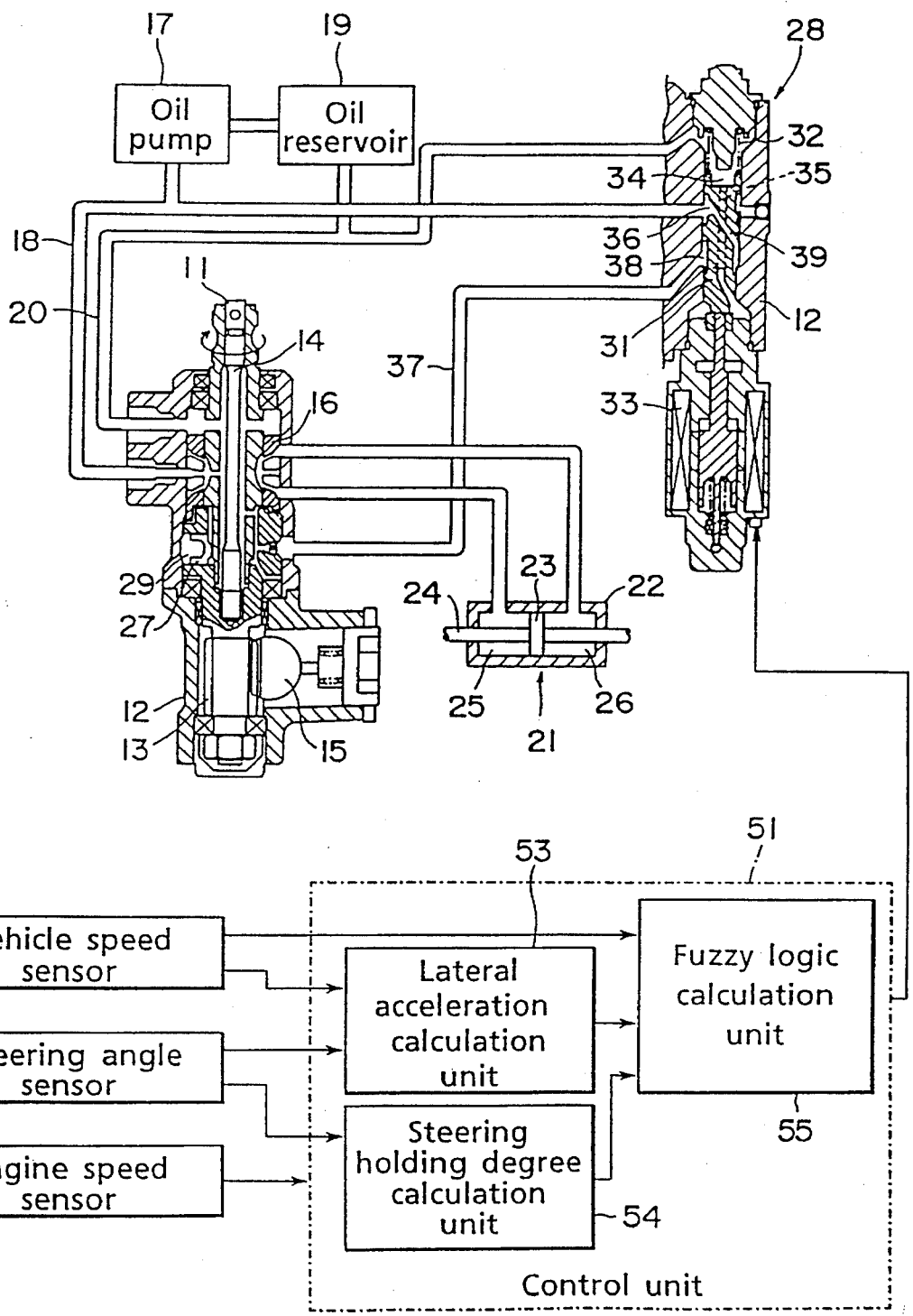
FIG. 1 is a schematic view showing structure of a hydraulic pressure control unit for power steering of a first embodiment of the power steering apparatus according to the present invention.

Referring to FIG. 1, an input shaft 11 is to receive steering force from a steering wheel (not shown), and is rotatably supported in a casing 12. The input shaft is rotatably provided at its lower end with a pinion gear and with a torsion bar 14 in its hollow portion, of which only an upper end is coupled with the input shaft 11. The pinion gear 13 is in serration coupling engagement with a lower end of the torsion bar 14, and the pinion gear 13 engages with a rack 15, whereby steering force of the input shaft 11 is transmitted to the pinion gear 13 through the torsion bar 14, and then to the rack 15 so that the rack 15 is moved in an axial direction to steer the wheels of the vehicle.

A rotary valve 16 in the casing 12 is opened and closed according to a difference in phase in a peripheral direction between the input shaft 11 and the pinion gear 13, and is connected with a hydraulic oil supply tube 18 of an oil pump 17 and a hydraulic oil discharge tube 20 of an oil reservoir 19. On the other hand, a power steering hydraulic cylinder 21 comprises a piston 23 supported in the cylinder 22 to be movable in an axial direction, and a piston shaft 24 of the piston 23 is mounted halfway to the rack 15. The piston 23 partitions the cylinder 22 into right and left oil chambers 25 and 26.

Therefore, when steering force is inputted to the input shaft 11, the torsion bar 14 transmits the steering force to the pinion gear 13 while presenting some distortion. Consequently, the pinion gear 13 presents a difference in phase with respect to the input shaft 11 towards the steering side, and the rotary valve 16 is driven according to the difference in phase. The rotary valve 16 is opened and closed so that hydraulic oil is supplied from the oil pump 17 to the individual oil chambers 25 and 26 of the hydraulic cylinder 22 to provide the rack 15 with a steering assist force, producing a required steering assist force in the steering direction.

Reactive force plungers 27 for exerting, upon steering, steering reactive force to increase the steering force (that is, steering response) are provided on an outer periphery of a lower portion of the input shaft 11. The reactive force plungers 27 restrain the input shaft 11 under the control of a hydraulic pressure control valve 28. That is, the present embodiment has four units of the reactive force plungers 27 at equal intervals in the casing 12 so as to surround the outer periphery of the input shaft 11 and, at its outer end side, chambers 29 are formed. On the other hand, the hydraulic pressure control valve 28 is provided in the casing 12 laterally adjacent and parallel to the input shaft 11. In the hydraulic pressure control valve 28, a spool is provided to be movable in a vertical direction in the casing 12, which is biased downward by a spring 92 provided at an upper part. A solenoid 33 is provided on an outer periphery of lower part of the spool 31 so that the solenoid 33 is energized to exert upward axial force to the spool The spool 31 has a pair of oil passages 34 and 35 communicated with the hydraulic oil discharge tube 20 of the oil reservoir 19, an annular oil passage 36 for communicating with the hydraulic oil supply tube 18 of the oil pump 17, an annular oil passage 38 for communicating with the chamber 29 of the reactive force plunger 27 by way of a hydraulic supply/discharge tube 37, and an oil passage 39 for communicating the annular oil passages 36 and 38 with each other. Therefore, normally, when the solenoid 33 is unenergized, the spool 31 is at its downward position, and the hydraulic oil supply tube 18 and the annular oil passage 36 communicate with each other. As a result, hydraulic oil is supplied from the oil pump 17 to the hydraulic pressure control valve 28 through the hydraulic oil supply tube 18, and to the chamber 29 of the reactive force plunger 27 from the annular oil passage 36 through the oil passage 39 and the annular oil passage 38. On the other hand, when the solenoid 33 is energized, the spool 31 is at its upward position, and the hydraulic oil supply tube 18 and the annular oil passage 36 do not communicate with each other. Therefore, hydraulic oil is not supplied to the hydraulic pressure control valve The hydraulic pressure control valve 28 is controlled by a control unit (CU) 51. That is, the control unit 51 is connected with a vehicle speed sensor 4t, a steering angle sensor 52, an engine speed sensor 42, and the like. The control unit 51 has a lateral acceleration calculation unit 53, a steering holding degree calculation unit 54, and a fuzzy logic calculation unit 55 for setting the target steering assist amount by way of fuzzy logic calculation. In the control unit 51, the lateral acceleration calculation unit 53 calculates a lateral acceleration $G_Y$ generated on the vehicle from a vehicle speed V inputted from the vehicle speed sensor 41 and a steering angle ha inputted from the steering angle sensor 52. Further, the lateral acceleration calculation unit 53 multiplies the vehicle speed V by the calculated lateral acceleration $G_Y$ to obtain a product $V \cdot G_Y$, which is output ted to the fuzzy logic calculation unit 55.

In the control unit 51, the steering holding degree calculation unit 54 calculates a steering angular velocity ha' according to the steering angle ha inputted from the steering angle sensor 52 and a steering angle changing amount H in a predetermined time, determines a steering holding coefficient $K_S$ from the steering angular velocity ha', the steering angle changing amount H, and the lateral acceleration $G_Y$ inputted from the lateral acceleration calculation unit 58, and outputs the steering holding coefficient $K_S$ to the fuzzy logic calculation unit 55. The fuzzy logic calculation unit 55 performs a Fuzzy logic calculation from the vehicle speed V inputted From the vehicle speed sensor 41, the product $V \cdot G_Y$ inputted From the lateral acceleration calculation unit 58, and the steering holding coefficient $K_S$ inputted from the steering holding degree calculation unit 54, and outputs the calculation result to the hydraulic pressure control valve 28 so that current to be applied to the solenoid 33 is set to control the solenoid 33.

Figure 2:
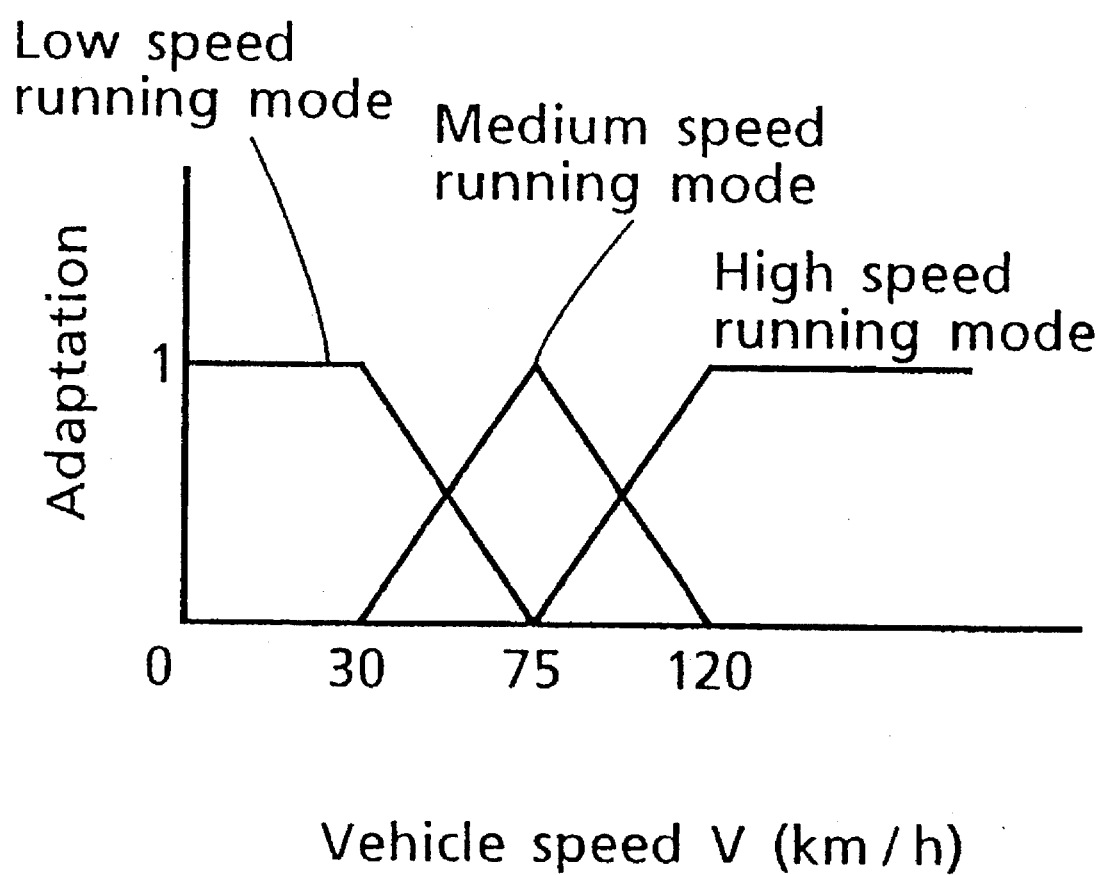
FIG. 2 is a graph showing a membership function for vehicle speed used for fuzzy logic control.
Figure 3:
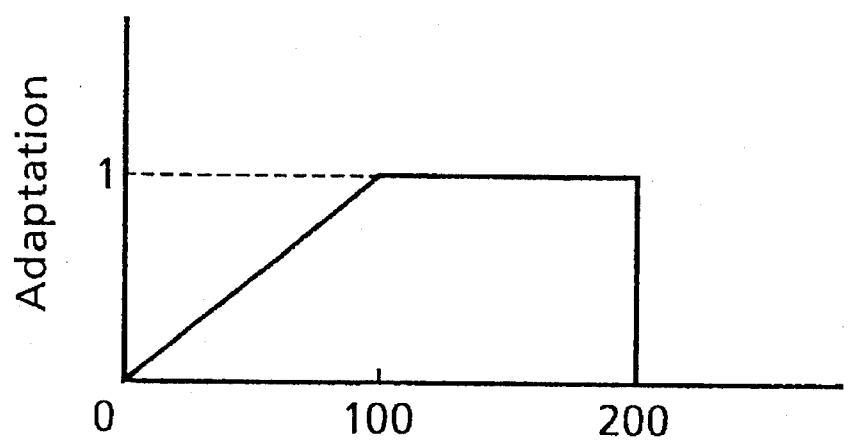
FIG. 3 is a graph showing a membership function for vehicle speed x lateral acceleration used For Fuzzy logic control.
Figure 4:
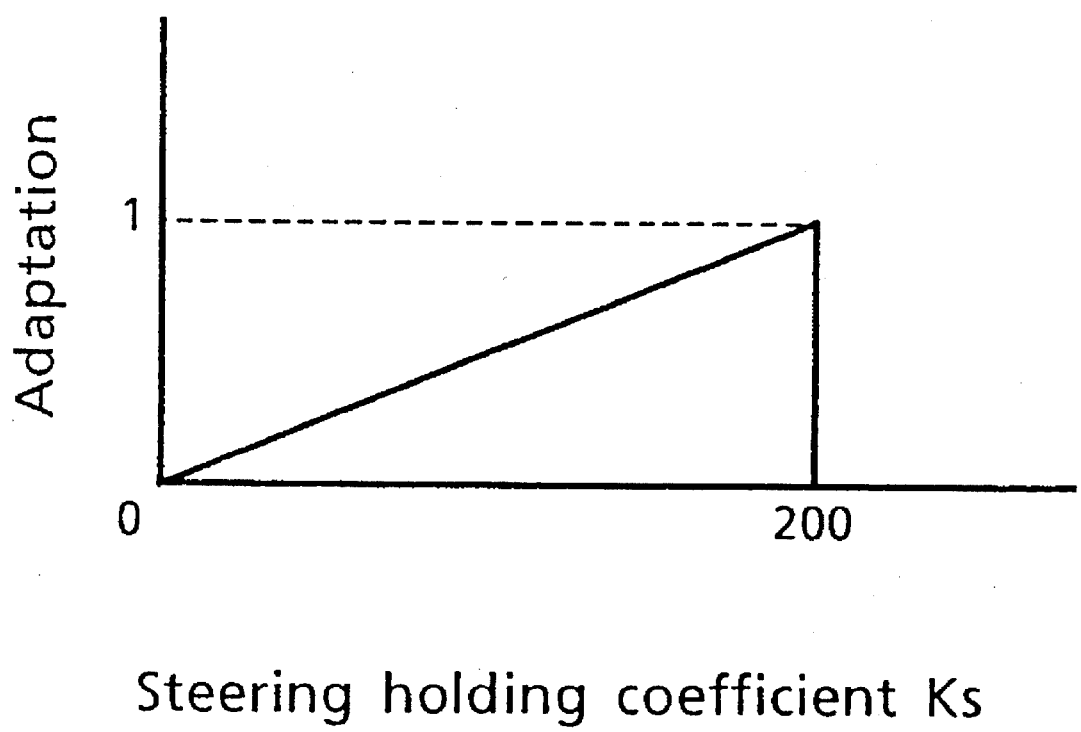
FIG. 4 is a graph showing a membership function for a steering holding coefficient used for fuzzy logic control.
Figure 5:
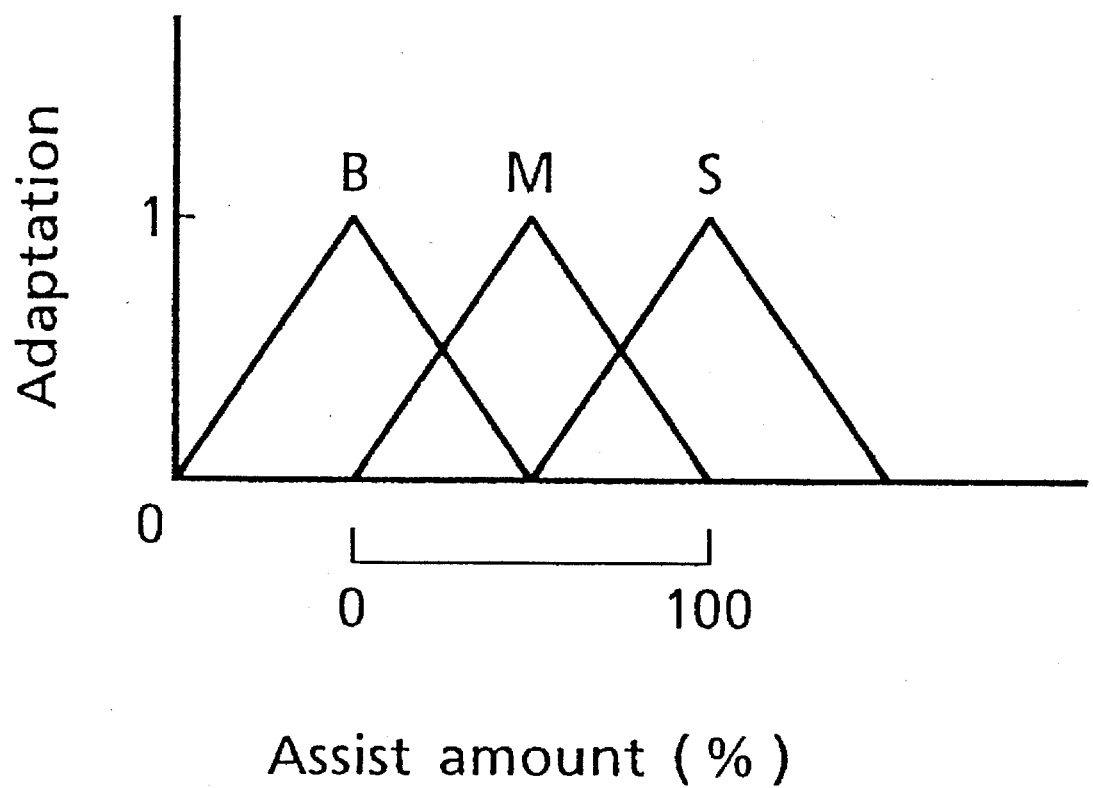
FIG. 5 is a graph showing calculation for obtaining a power steering assist amount from an adaptation of the individual membership functions by an elastic center method.

In the fuzzy logic calculation unit 55, as shown in FIG. 2, a membership function is included for obtaining an adaptation (grade) of the running condition from the vehicle speed V. Further, as shown in FIG. 3, a membership function is included for obtaining an adaptation of the calculated value $V \cdot G_Y$ as the product of the vehicle speed V and the lateral acceleration $G_Y$. Finally, as shown in FIG. 4, a membership function is included for obtaining an adaptation of the steering holding coefficient $K_S$. In Fuzzy logic calculation unit 55, these three membership functions are applied to obtain an adaption of the vehicle speed V, an adaptation of the calculated value $V \cdot G_Y$, and an adaptation of the steering holding coefficient $K_S$ of the running condition of the vehicle. From these adaptations, as shown in FIG. 5, a control amount, that is, a steering assist amount, is determined using the method of elastic center From the graph showing a trapezoidal set to control the amount of current to be applied to the solenoid 33.

In the present embodiment, as running conditions, three modes are set including a low speed running mode for the vehicle speed V of 0 to 75 km/h, a medium speed running mode for 30 to 120 km/h, and a high speed running mode for more than 75 km/h. Further, an adaptation for each of those modes is determined in response to the vehicle speed V. On the other hand, as shown in FIG. 5, evaluation of the assist control amount is divided into three stages of S (small), M (medium), and B (big), so that the assist amount is set to 100% in the evaluation S, and the assist amount is set to 0% in the evaluation B.

Then, the steering modes and the assist amounts are made to correspond to each other such that the low speed running mode corresponds to the evaluation S of the assist amount, the medium speed running mode to the evaluation M, and the high speed running mode to the evaluation B. That is, a rule is applied such that when the vehicle speed V increases, the steering assist amount is decreased to make steering heavier.

Further, as shown in FIG. 3, the membership function regarding the product $V \cdot G_Y$ of the vehicle speed V and the lateral acceleration $G_Y$ is set such that the adaptation is linearly increased in response to an increase in the calculated value $V \cdot G_Y$ up to a region where the calculated value $V \cdot G_Y$ is 0 to 100 Gkm/h, and the adaptation is fixed independent of the calculated value $V \cdot G_Y$ in a region where the calculated value $V \cdot G_Y$ is more than 100 Gkm/h. The membership function regarding the calculated value $V \cdot G_Y$ is made to correspond to the evaluation B of assist amount according to the adaptation. That is, when the calculated value $V \cdot G_Y$ increases, the steering assist amount is decreased to make steering heavier.

The membership function regarding the steering holding coefficient $K_S$ is set such that the adaptation is increased in response to an increase in the steering holding coefficient $K_S$ up to a region where the steering holding coefficient $K_S$ is 0 to 200. The membership function regarding the steering holding coefficient $K_S$ is made to correspond to the evaluation S of the steering assist amount according to the adaptation. That is, when the steering holding coefficient increases, the steering assist amount is increased to make steering lighter.

Figure 6:
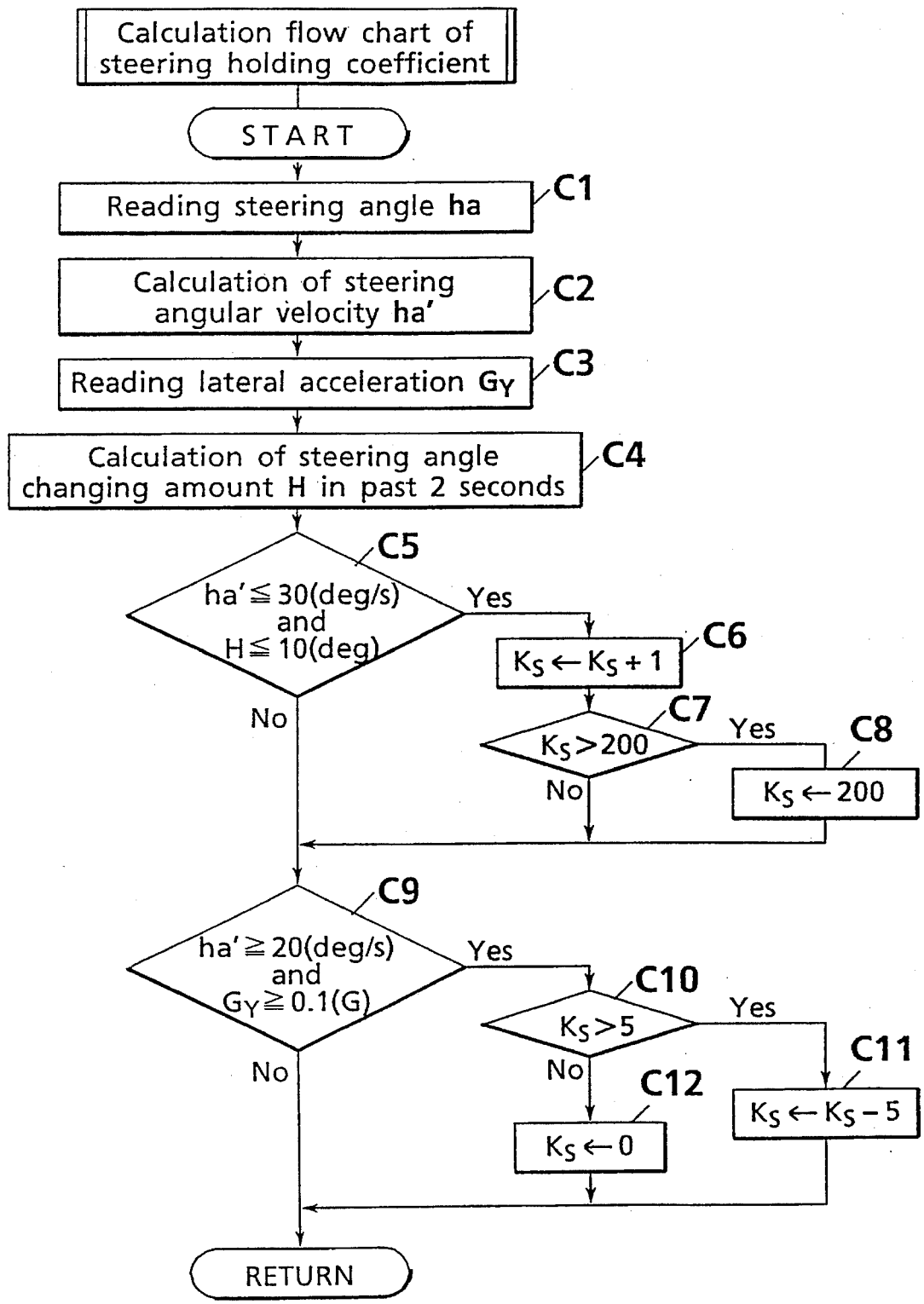
FIG. 6 is a flow chart for calculating the steering holding coefficient.
Figure 7:
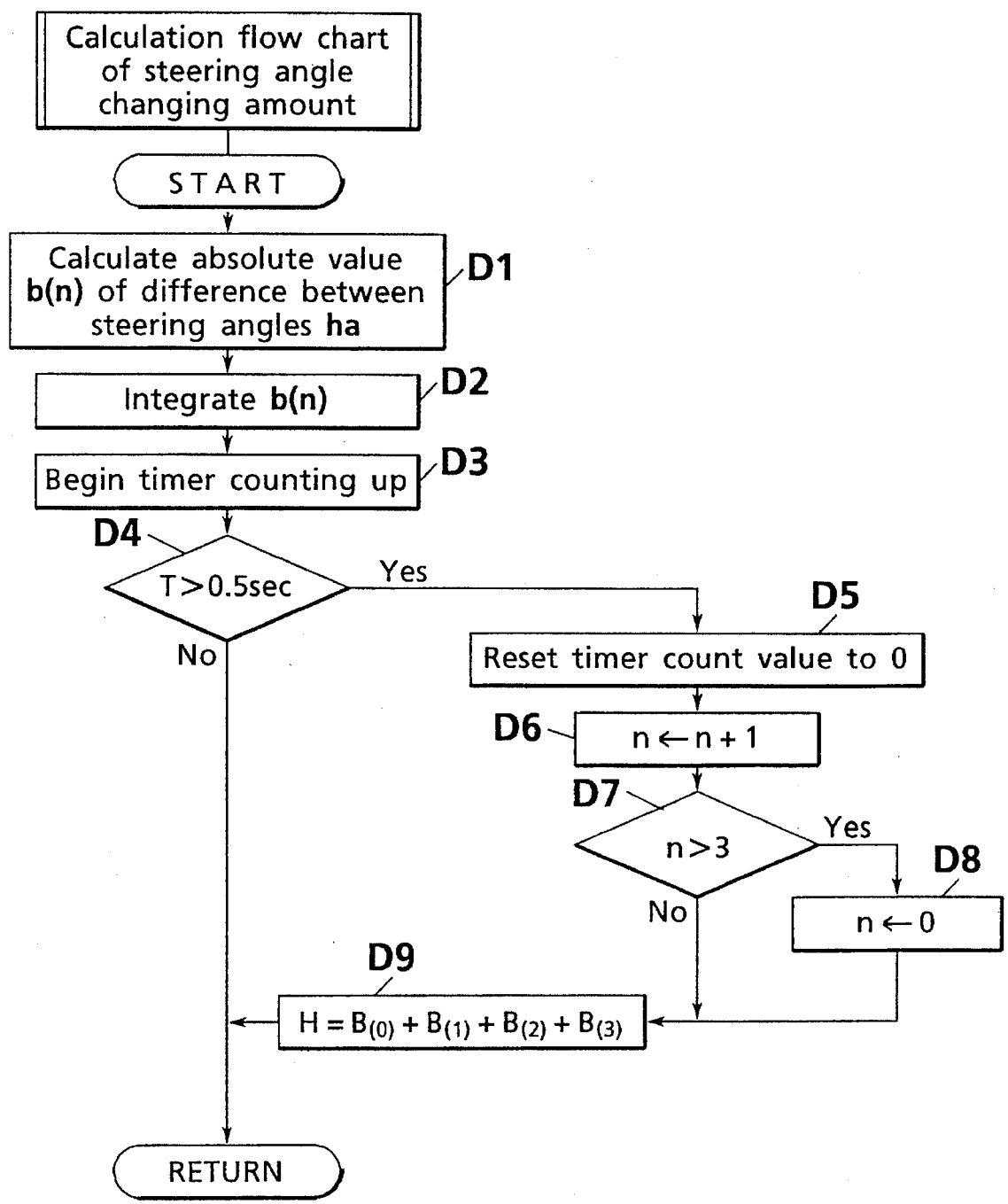
FIG. 7 is a flow chart for calculating a steering-angle changing amount.

Calculation of the steering holding coefficient $K_S$ by the steering holding degree calculation unit 54 will be described with reference to the flow charts shown in FIG. 6 and FIG. 7. As shown in FIG. 6, in step C1, the steering angle ha is read from the steering angle sensor 52 and, in step C2, the steering angular velocity ha' is determined by calculation from the steering angle ha. In step C3, the lateral acceleration $G_y$ is read from the lateral acceleration calculation unit 53 and, in step C4, the steering angle changing amount H in past 2 seconds is determined using a calculation method described later.

In step C5, a determination is made as to whether or not the steering angular velocity ha' is not more than 30 degrees/s and the steering angle changing amount H is not more than 10 degrees. That is, this step is to determine the steering holding condition of the driver, and when the driver is in the steering holing condition, the steering holding coefficient $K_S$ is counted up in steps 6 to 8. Therefore, when the steering angular velocity ha' and the steering angle changing amount H are within a predetermined steering holding range in step C5, it is determined that the driver is not steering so much, that is, in the steering holding condition, and the processing proceeds to step C6. On the other hand, when the steering angular velocity ha' or the steering angle changing amount H is not within the range, it is determined that the driver is steering and is not in the steering holding condition, and the processing proceeds to step C9.

When it is determined in step C5 that the driver is in the steering holding condition from the steering angular velocity ha' and the steering angle changing amount H, in step C6, the steering holding coefficient $K_S$ is counted up by 1. In step C7, a determination is made as to whether or not the steering holding coefficient $K_S$ is greater than 200. When it is greater than 200, in step C8 the steering holding coefficient $K_S$ is set to 200, and the processing proceeds to step C9. When it is not greater than 200, the steering holding coefficient $K_S$ is unchanged, and the processing proceeds to step C9.

In step C9, a determination is made as to whether or not the steering angular velocity ha' is not more than 20 degrees and the lateral acceleration $G_Y$ is not more than 0.1 G. That is, this step is to determine the driver's steering condition and, when the driver is in the steering condition, the steering holding coefficient $K_S$ is counted down in steps 10 to 12. Therefore, in step C9, when the steering angular velocity ha' and the lateral acceleration $G_Y$ are within a predetermined steering range, it is determined that the driver is in the steering condition, and the processing proceeds to C10. On the other hand, when the steering angular velocity ha' or the lateral acceleration $G_Y$ is not with the range, the driver is determined in the steering holding condition.

Since, in step C10, the driver is determined to be in the steering condition from the steering angular velocity ha' and the lateral acceleration $G_Y$, a determination is made as to whether or not the steering holding coefficient $K_S$ is greater than 5. When it is greater than 5, the processing proceeds to step C11, where the steering holding coefficient $K_S$ is counted down by 5. On the other hand, when the steering holding coefficient $K_S$ is not greater than 5, the processing proceeds to step C12, where the steering holding coefficient $K_S$ is set to 0.

As described above, the steering holding condition is determined in response to the steering angular velocity ha' and the steering angle changing amount H to increase the steering holding coefficient $K_S$. Further, the steering condition is determined in response to the steering angular velocity ha' and the lateral acceleration $G_Y$ to decrease the steering holding coefficient $K_S$. The adaptation of the membership function is determined from the resulting steering holding coefficient $K_S$, and the steering assist amount is determined according to the adaptation.

In the above described calculation flow chart of the steering holding coefficient $K_S$, the steering angle changing amount H is calculated using the following method. Calculation of the steering holding coefficient is made at every interrupt signal, for example, at every 50 msec, and the steering angle ha is read from the steering angle sensor 52 at every 50 msec. Then, as shown in FIG. 7, in step D1, the absolute value b of a difference between the present steering angle $ha_{(t)}$ and the previous steering angle $ha_{(t-1)}$ is calculated. In step D2, the absolute value b of the calculated steering angle is integrated to obtain $B_{(n)}$, and the passage timer begins counting up in step D3. A determination is made in step D4 as to whether or not the passage of time exceeds 0.5 second. If so, in step D5 the count value of the passage timer is reset to 0.

In step D6, n is incremented by 1. A determination is made in step D7 as to whether or not n exceeds 3, when it does not exceed 3, the processing proceeds to step D9. However, when it exceeds 3, n is set to 0 in step DS. In step D9, four of the integrated values of absolute values of the differences between steering angles, $B_{(0)}$, $B_{(1)}$, $B_{(2)}$, and $B_{(3)}$, are summed up to obtain the steering angle changing amount H in 2 seconds.

From the adaptation of the vehicle speed V, the adaptation of the product $V \cdot G_Y$, and the adaptation of the steering holding coefficient $K_S$ thus determined, the target steering assist amount can be obtained by the method of elastic center using the calculation graph shown in FIG. 5.

Then, in the electronically controlled power steering apparatus of the present embodiment described above, the control procedure by the control unit 51 will be described with reference to the flow chart shown in FIG. 8.

Figure 8:
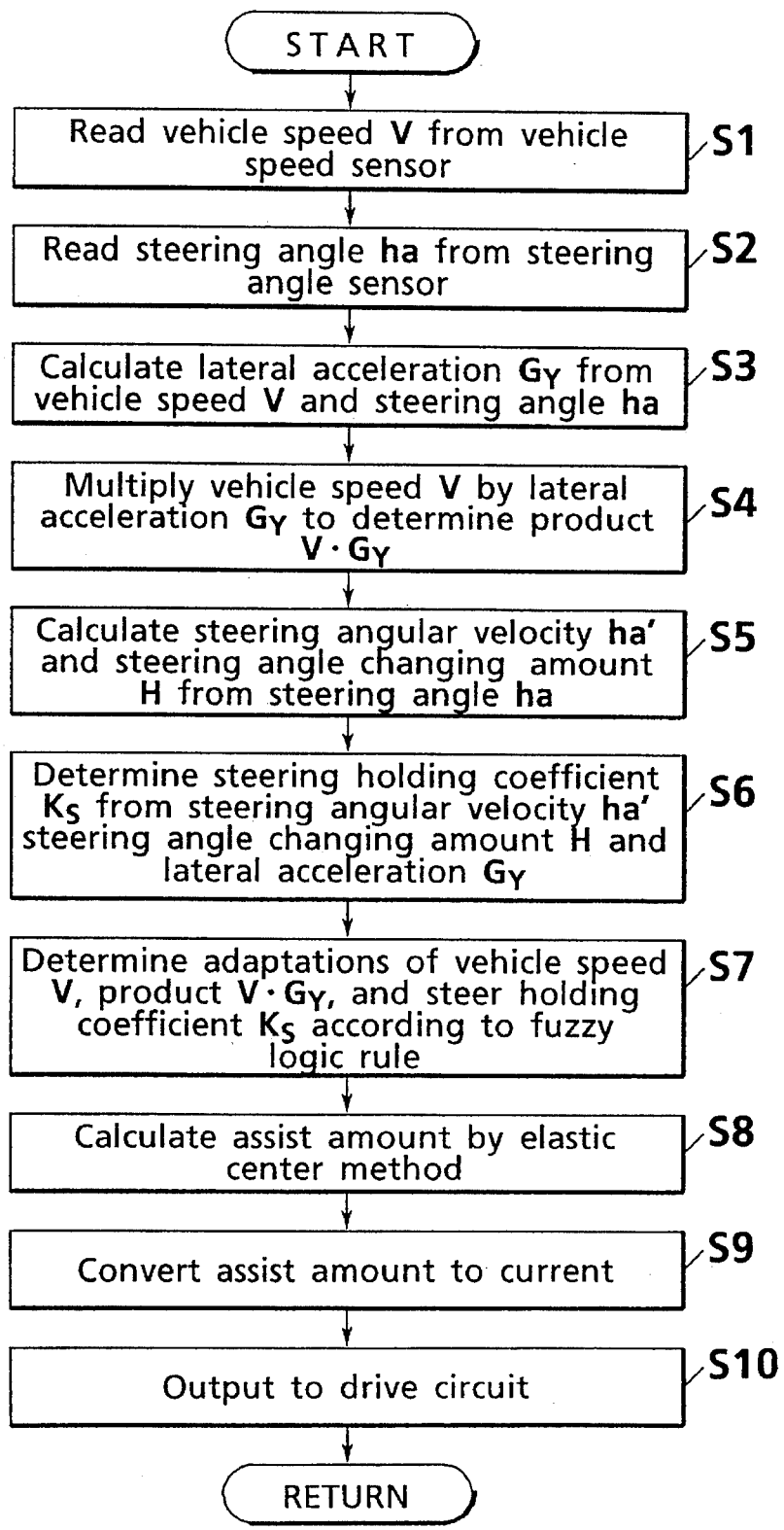
FIG. 8 is a flow chart showing fuzzy logic control.

Referring to FIG. 8, in step S1, the vehicle sensor 41 detects the running speed V of the running vehicle, the sensor signal of vehicle speed is outputted to the CU 51 (the lateral acceleration calculation unit 53 and the fuzzy logic calculation unit 55), and the processing proceeds to step S2. In step S2, the steering angle sensor 52 detects the steering angle ha of the vehicle, the sensor signal of the steering angle is outputted to the CU 51 (the lateral acceleration calculation 53 and the steering holding degree calculation unit 54), and the processing proceeds to step S3. In step S3, the CU 51 converts analog signals as the sensor signals of the vehicle speed V and the steering angle ha to digital signals, and the lateral acceleration calculation unit 53 calculates the lateral acceleration $G_Y$ acting upon the vehicle in response to the vehicle speed V and the steering angle ha. Further, in step S4, the vehicle speed V is multiplied by the lateral acceleration $G_Y$ to obtain the product $V \cdot G_Y$.

In step S5, the steering angular velocity ha' and the steering angle changing amount H are calculated from the steering angle ha, and the processing proceeds to step S6. In step S6, the steering holding coefficient $K_S$ is obtained from the steering angular velocity ha', the steering angle changing amount H, and the lateral acceleration $G_Y$.

In step S7, in the fuzzy logic calculation unit 55, the adaptation regarding running condition of the vehicle speed V is determined from the graph of the membership function shown in FIG. 2, the adaptation regarding running condition of the product $V \cdot G_Y$ is determined from the graph of the membership function shown in FIG. 3, and the adaptation regarding running condition of the steering holding coefficient $K_S$ is determined from the graph of the membership function shown in FIG. 3. In step S8, from these adaptations, the target assist amount is determined using the graph of calculation shown in FIG. 5 by the method of elastic center. Further, in step S9, the target steering assist amount is converted to current to be applied to the solenoid 33 of the hydraulic pressure control valve 28 and, in step S10, the current to control the steering assist amount is outputted to the drive circuit, that is, the solenoid 33 of the hydraulic pressure control valve 28.

Next, fuzzy logic control in practical running condition of the vehicle will be described with reference to calculation for obtaining the steering assist amount by the method of elastic center shown in FIG. 9. For example, suppose a condition where the vehicle is running at a vehicle speed V of 60 km/h with almost no steering. This condition corresponds to a case where the vehicle is steering running in the medium speed running mode on a moderate and long curve with a large curvature of an expressway or a cant road. In this case, the lateral acceleration $G_Y$ when the vehicle is running at a vehicle speed V of 60 km/h is 0.2 G, and the steering holding coefficient $K_S$ is 200.

Figure 9:
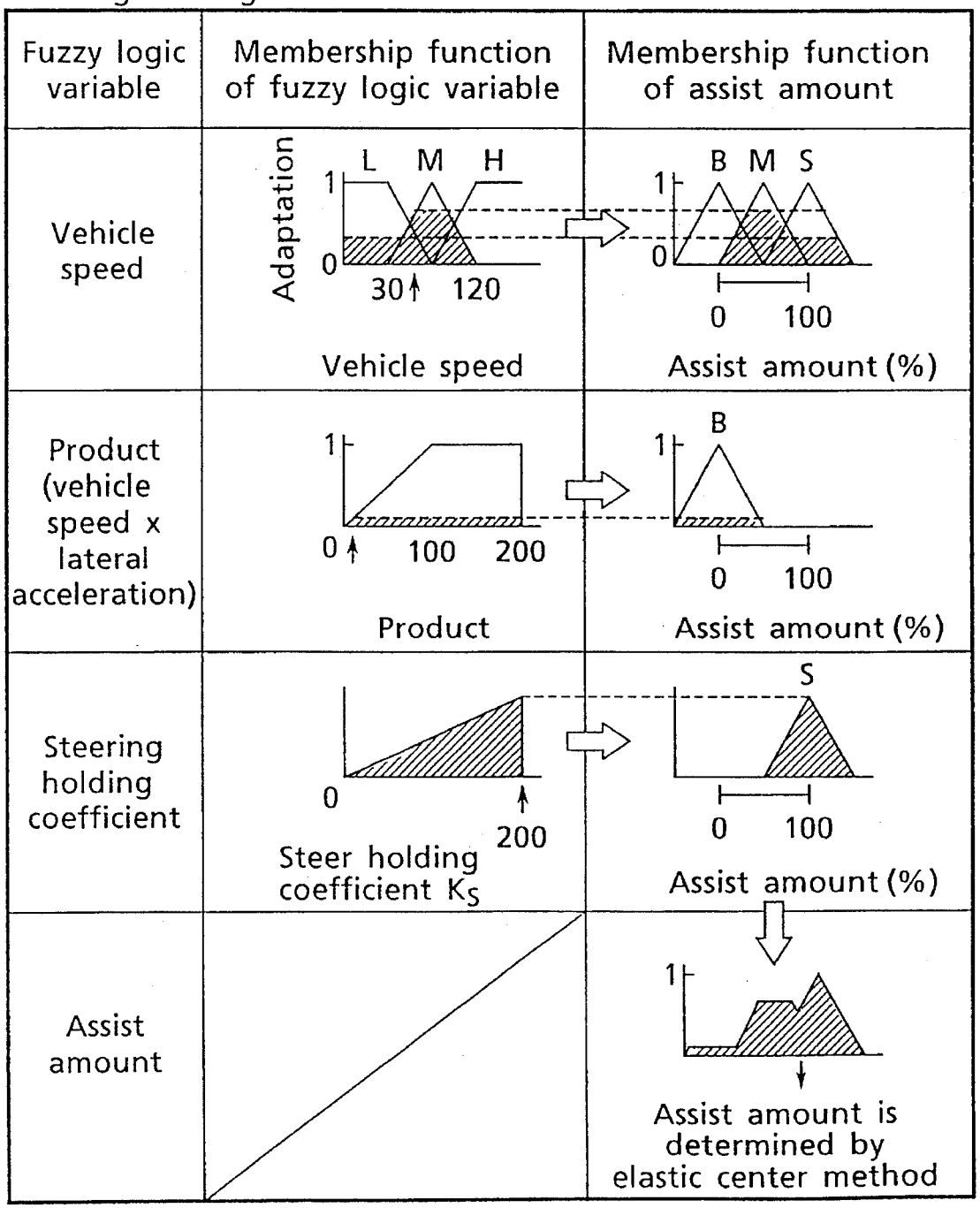
FIG. 9 is a schematic illustration showing a practical control example of a calculation for obtaining the steering assist amount by an elastic center method from the individual membership functions for vehicle speed, vehicle speed x lateral acceleration, and the steering holding coefficient.

Therefore, as shown in FIG. 9, when the vehicle speed V is 60 km/h, the adaptation of the medium speed running mode is 0.67, and the adaptation of the low speed running mode is 0.33, evaluation of the assist control amount corresponding to medium speed running is M, and evaluation of the steering assist control amount corresponding to low speed running is S. Further, the lateral acceleration $G_Y$ at that time is 0.2 G, the product of the vehicle speed V (60 km/h) and the lateral acceleration $G_Y$ (0.2 G) is 12 Gkm/h, and the adaptation is 0.12. Further, the steering holding coefficient $K_S$ at that time is 200, and the adaptation is 1.

The elastic center position of the total area corresponding to the adaptation is determined from the individual adaptations of the thus obtained vehicle speed V, the product $V \cdot G_Y$, and the steering holding coefficient $K_S$ to determine the target steering assist amount. That is, in the steering holding condition at a vehicle speed V of 60 km/h, evaluation of the steering assist control amount regarding the vehicle speed V is M and its adaptation is 0.67, and in evaluation S its adaptation is 0.33, evaluation of the steering assist, control amount regarding the product $V \cdot G_Y$ is B and its adaptation is 0.12, and evaluation of the steering assist control amount regarding the steering holding coefficient $K_S$ is S and its adaptation is 1. Therefore, the assist amount is about 92%.

As described above, when the vehicle is in the steering holding running condition at a vehicle speed of 60 km/h, since the vehicle speed V is high but the lateral acceleration $G_Y$ is low, and the steering holding coefficient $K_S$ increases, the steering assist amount of power steering is as high as 92%. That is, when the vehicle is running at a high speed, since the vehicle speed V is high, in general, the steering assist amount of power steering is decreased to make steering heavier, however, when the driver is holding the steering wheel at a slight steering angle without steering the steering wheel, the driver is required to use a large steering (steering holding) force, which may be a heavy burden to the driver. Therefore, in the present embodiment, the steering holding coefficient $K_S$ according to the steering angular velocity ha' and the steering angle changing amount H of the steering mechanism and the lateral acceleration $G_Y$ is applied as a membership function so that when the vehicle is in the steering holding condition during high speed running, the steering holding coefficient $K_S$ is increased and decreased to increase the steering assist amount of power steering to make steering lighter than usual.

As described above, since, in the electronically controlled power steering apparatus of the present embodiment, in addition to the increase and decrease in vehicle speed V, the steering holding coefficient $K_S$ according to the steering angular velocity ha', steering angle changing amount H, and the lateral acceleration $G_Y$ is applied as a membership function, the steering assist amount is controlled in accordance with a fuzzy logic rule according to these membership functions, the steering assist amount is decreased as the vehicle speed increases and steering becomes heavier to stabilize the steering wheel. On the other hand, in the steering holding condition of the vehicle during high speed running, the steering holding coefficient $K_S$ is increased to increase the steering assist amount increasing rate, thereby making the steering wheel lighter to this extent. Therefore, in the high speed steering holding condition, the driver is not required to use a large steering (steering holding) force, thereby enabling easy operation of the steering wheel.

Even when the vehicle is running on a cant road with a steering angle of 1 to 3 degrees, in the steering holding condition of the vehicle, an optimum steering assist amount is determined according to the steering holding coefficient $K_S$, and the driver can easily operate the steering wheel with a small steering holding force.

Further, since in the electronically controlled power steering apparatus of the present embodiment, the product $V \cdot G_Y$ of the vehicle speed V and the lateral acceleration $G_Y$ is applied as a membership function, and the steering assist amount is controlled in accordance with a fuzzy logic rule using these membership functions, when the vehicle advances to a corner, due to an increase in the lateral acceleration $G_Y$ (steering angle), the decreasing rate of the steering assist amount is increased, and the steering wheel becomes heavier to this extent. Therefore, even with different vehicle speed conditions, the driver is able to steer while feeling the advance to the corner with the steering wheel. Also, a steering linearity region is provided in the membership function regarding the lateral acceleration $G_Y$ where the adaptation varies linearly relative to the lateral acceleration $G_Y$, thereby assuring the steering linearity.

Further, since in the electronically controlled power steering apparatus of the present embodiment, the product $V \cdot G_Y$ of the vehicle speed V and the lateral acceleration $G_Y$ is applied as a membership function for controlling the steering assist amount, in high speed running of the vehicle, since the vehicle speed V is sufficiently high even through the steering angle decreases to decrease the lateral acceleration $G_Y$, the product $V \cdot G_Y$ is not substantially decreased, the target steering assist amount is not substantially increased, and steering is not lightened very much. Therefore, steering feeling in high speed running of the vehicle is sufficiently maintained, with improved stability of steering wheel operation.

Further, in the electronically controlled power steering apparatus of the present invention, the steering assist amount is controlled in accordance with three fuzzy logic rules where the steering assist amount is decreased to make steering heavier as the vehicle speed V increases, the steering assist amount is decreased to make steering heavier as the product $V \cdot G_Y$ increases, and the steering assist amount is increased to make steering lighter as the steering holding coefficient $K_{YS}$ increases, thereby enabling fine control with a reduced number of fuzzy logic rules.

Figure 10:
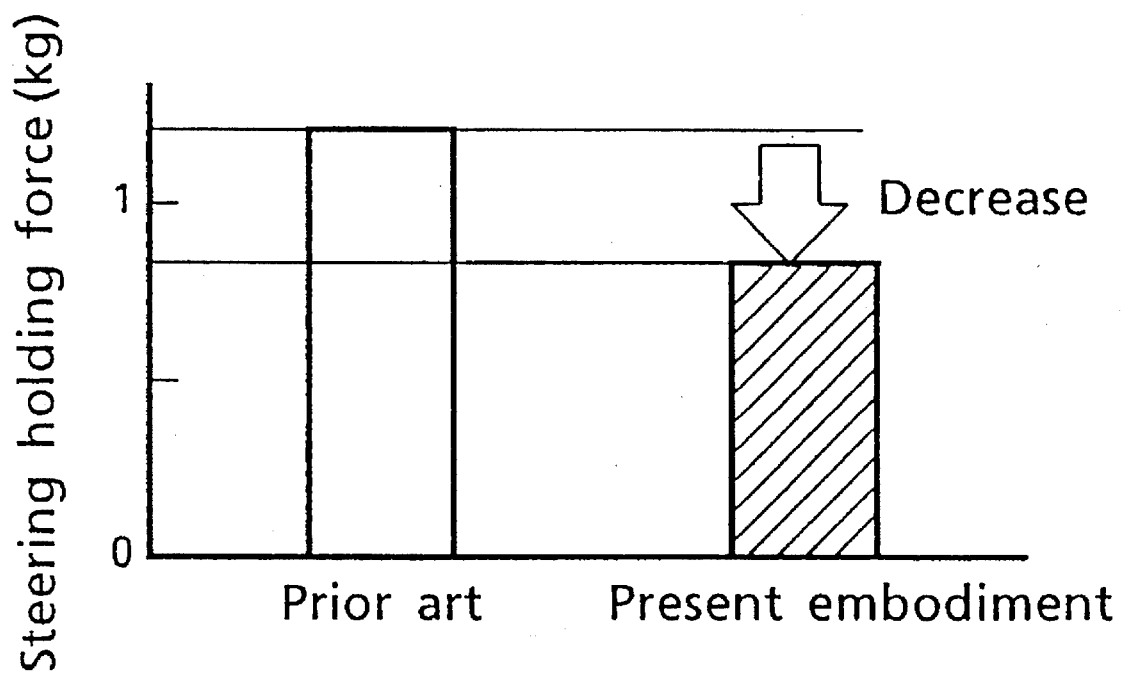
FIG. 10 is a graph showing an effect regarding the steering holding force in high speed running steering holding by fuzzy logic control of the present embodiment.

Here, the electronically controlled power steering apparatus of the present embodiment, when applied to the vehicle, is experimentally evaluated for the steering holding force against the steering angle in steering holding during high speed running. That is, the steering holding force against the steering angle in steering holding during high speed running is as shown in the graph in FIG. 10. In FIG. 10, the hatched region indicates the steering holding force of the electronically controlled power steering apparatus (EPS) of the present embodiment, and the blanked region indicates the steering holding force of a conventional electronically controlled power steering apparatus (EPS). As shown in FIG. 10, in the EPS of the present embodiment, the steering holding force can be considerably decreased for high speed running steering holding, as compared to the conventional EPS.

A second embodiment of the electronically controlled power steering apparatus of the present invention will be described. The electronically controlled power steering apparatus of the present embodiment is similar to the first embodiment in the structure and functions, except for differing in calculation method of steering holding coefficient. Therefore, detailed description of similar portions is omitted.

Figure 11:
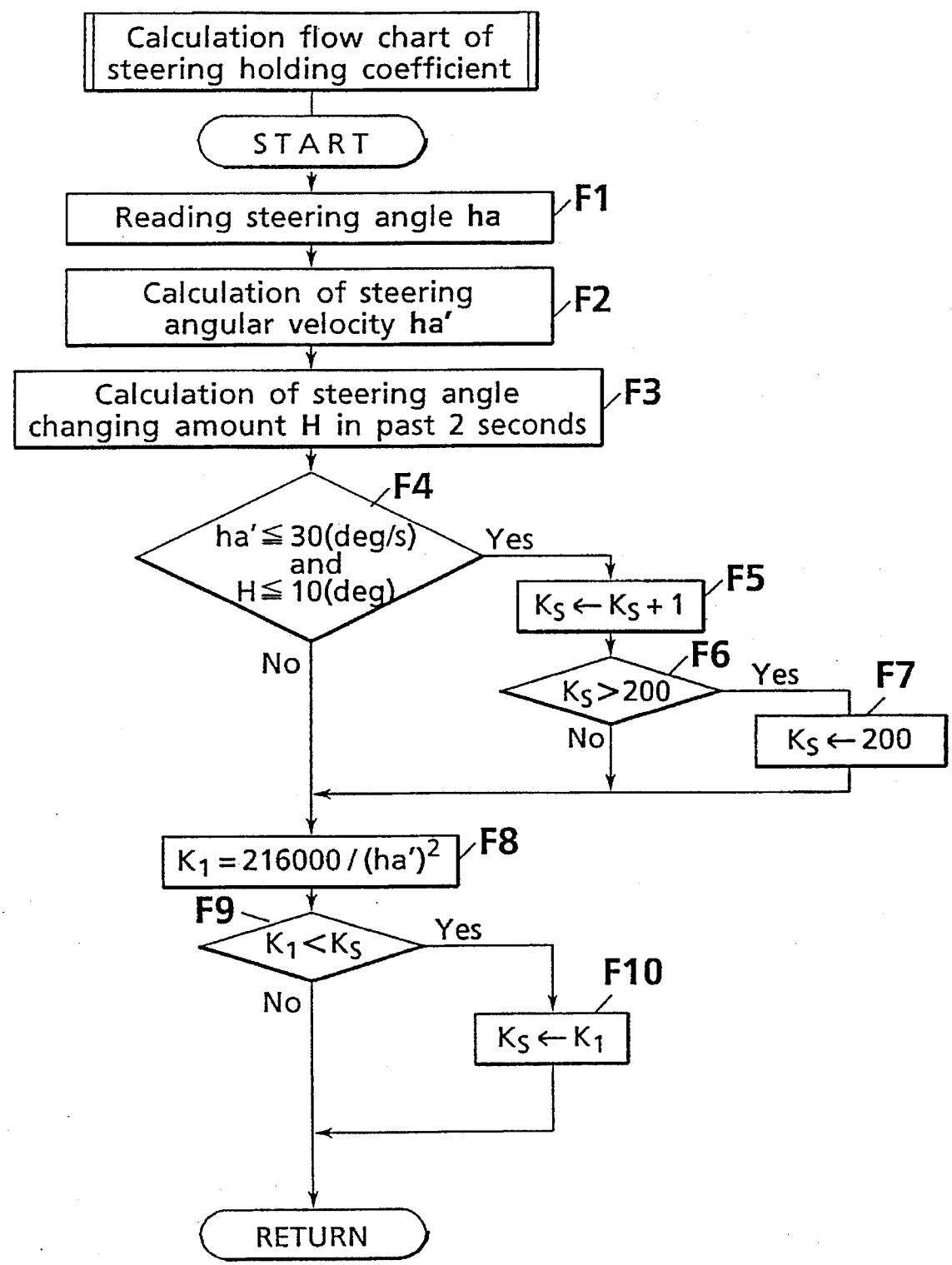
FIG. 11 is a flow chart showing calculation of the steering holding coefficient in a second embodiment of the control system for a power steering apparatus of the present invention.
Figure 12:
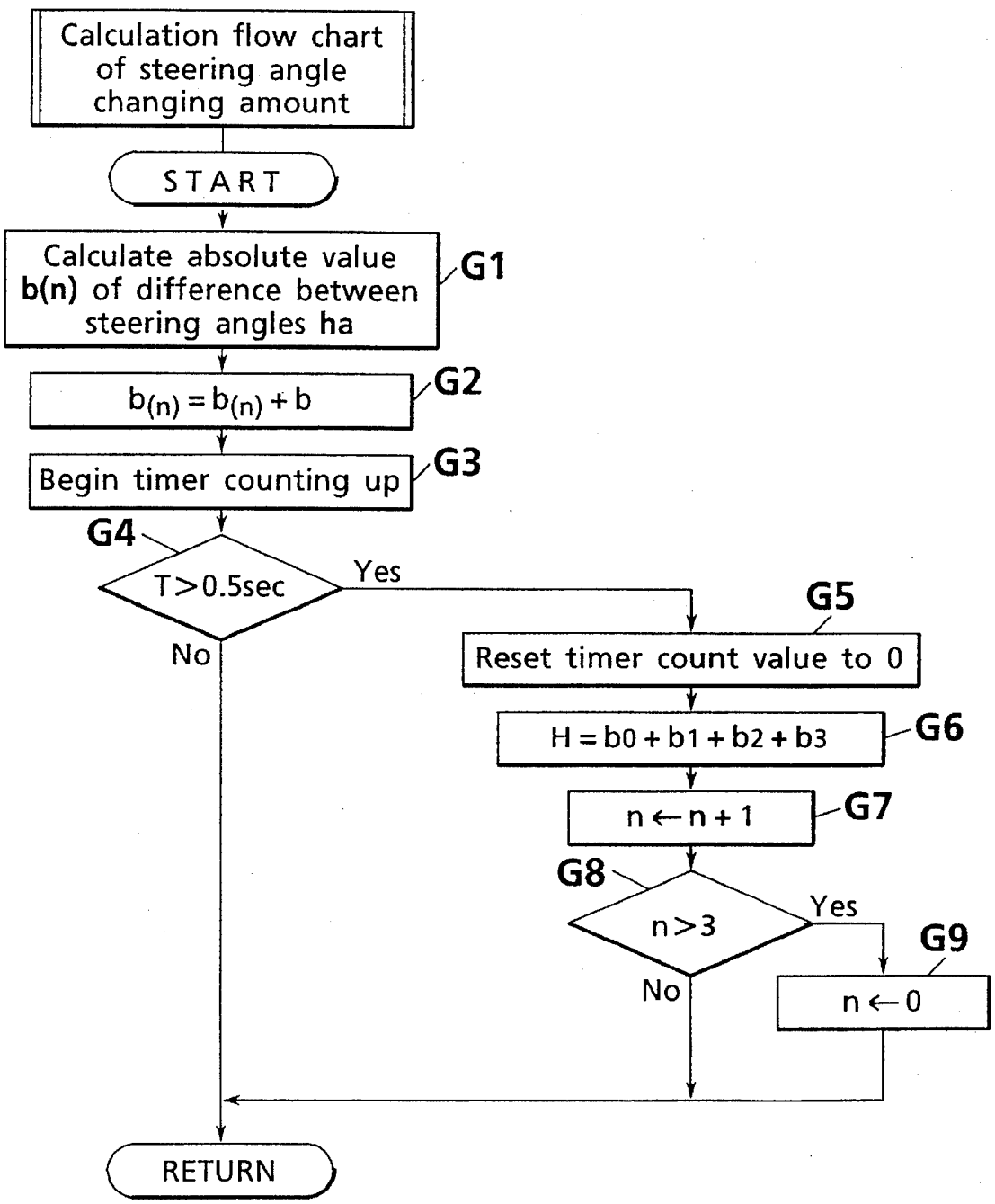
FIG. 12 is a flow chart showing calculation of steering angle changing amount.

The calculation method of the steering holding coefficient $K_S$ by the steering holding degree calculation unit 54 will be described with reference to the flow charts in FIG. 11 and FIG. 12. As shown in FIG. 11, in step F1, the steering angle ha is read from the steering angle sensor 52, and in step F2, the steering angular velocity ha' is calculated from the steering angle ha. In step F3, the steering angle changing amount H in the past 2 seconds is determined by a calculation method which will be described later.

In step F4, a determination is made as to whether or not the steering angular velocity ha' is not more than 30 degrees/s and the steering angle changing amount H is not more than 10 degrees. That is, this step is to determine the driver's steering holding condition, if in the steering holding condition, the steering holding coefficient $K_S$ is counted up in subsequent steps F6 to F8. Therefore, in step F4, when the steering angular velocity ha' and the steering angle changing amount H are within a predetermined steering range, it is determined that the driver is not steering so much, that is, in the steering holding condition, and the processing proceeds to step F5. On the other hand, if the steering angular velocity ha' or the steering angle changing amount H is not within the range, it is determined that the driver is steering and is not in the steering holding condition, and the processing proceeds to step F8.

When it is determined in step F4 that the driver is the steering holding condition from the steering angular velocity ha' and the steering angle changing amount H, the steering holding coefficient $K_S$ is counted up by 1. Then, in step F6, a determination is made as to whether or not the steering holding coefficient $K_S$ is greater than 200. When it is greater than 200, in step F7, the steering holding coefficient $K_S$ is set to 200, and the processing proceeds to step F8. When it is not greater than 200, the steering holding coefficient $K_S$ is unchanged, and the processing proceeds to step FS.

Step F8 is to set the steering holding coefficient $K_S$ when the driver is in the steering condition and, if the driver is in the steering condition, in the subsequent steps F8 to F10, the steering holding coefficient $K_S$ is calculated to substitute for the steering holding coefficient $K_S$. First, in step F8, a steering holding release coefficient $K_S$ is calculated according to the following equation:

Steering holding release coefficient $K_1$= steering holding coefficient standard value k/(steering angular velocity ha')$^2$ The steering holding coefficient standard value k corresponds to the steering angular velocity ha' applied to determine the driver's steering holding condition which, in the present embodiment, the steering holding coefficient standard value k=216000 corresponding to steering angular velocity ha'=30 degrees/s, and a dead zone is provided between the steering holding condition and the steering condition.

In step F9, a determination is made as to whether or not the steering holding release coefficient $K_1$ is smaller than the steering holding coefficient $K_S$, if so, it is determined that the driver is in the steering condition, and the processing proceeds to step F10, where the steering holding release coefficient $K_1$ is substituted for the steering holding coefficient $K_S$. On the other hand, when the steering holding release coefficient, $K_1$ is not smaller than the steering holding coefficient $K_S$, the driver is determined to still be in the steering holding condition.

As described above, the steering holding condition is determined from the steering angular velocity ha' and the steering angle changing amount $K_S$ to increase the steering holding coefficient $K_S$, and the steering holding coefficient $K_S$ is substituted by setting the steering holding coefficient $K_S$ using a predetermined equation by the steering angular velocity ha'. Then, the adaptation of the membership function is determined from the thus obtained steering holding coefficient $K_S$, and the assist control amount is determined according to the adaptation. Specifically, for example, when the vehicle is running on a moderate and long curve with a large curvature of an expressway, since the driver is steering the steering wheel at a steering angle according to the curvature of the road, and the steering angular velocity ha' and the steering angle changing amount H are less than a predetermined range, the driver is determined to be in the steering holding condition, and the steering holding coefficient $K_S$ is counted up to a maximum of 200. When, from the steering holding condition (steering holding coefficient $K_S$=200), the driver steers by a predetermined amount to change the lane, since the steering angular velocity ha' and the steering angle changing amount H exceed the predetermined range, it is determined that the steering wheel is steered to stop up counting of the steering holding coefficient $K_S$. Further, the steering holding release coefficient $K_1$ calculated from the steering angular velocity ha' at that time is substituted as the steering holding coefficient $K_S$ to decrease the steering holding coefficient $K_S$ from 200.

Further, the above-described steering angle changing amount H to be calculated in the calculation flow chart of the steering holding coefficient $K_S$ is calculated as follows. Calculation of the steering holding coefficient $K_S$ is performed in a predetermined period, for example, at an interrupt signal of every 50 msec, and the steering angle ha is read from the steering angle sensor 52 every 200 microseconds. Then, as shown in FIG. 12, in step G1, the difference b between the present steering angle $ha_{(t)}$ and the previous (before 50 msec) steering angle $ha_{(t-1)}$ is calculated. In step G2, the absolute value b of the thus calculated difference steering angle is integrated to obtain $b_{(n)}$, and up counting of the passage timer begins in step G3. In step G4, a determination is made as to whether or not the passage time T exceeds 0.5 second and, if so, the count value of the passage timer is reset to 0 in step GS.

In step G6, absolute values $b_{(0)}$, $b_{(1)}$, $b_{(2)}$, and $b_{(3)}$ for 0.5 seconds are integrated to determine the steering angle changing amount H for 2 seconds. Then, in step G7, n is incremented by 1, a determination is made in step G8 whether or not n exceeds 3 and, if so, n is set to 0 in step G9.

From the above determined adaptation of the vehicle speed V, the adaptation of the product V·$G_Y$, and the adaptation of the steering holding coefficient $K_S$, the target steering assist amount can be obtained by the method of elastic center using the calculation graph shown in FIG. 5.

Figure 15:
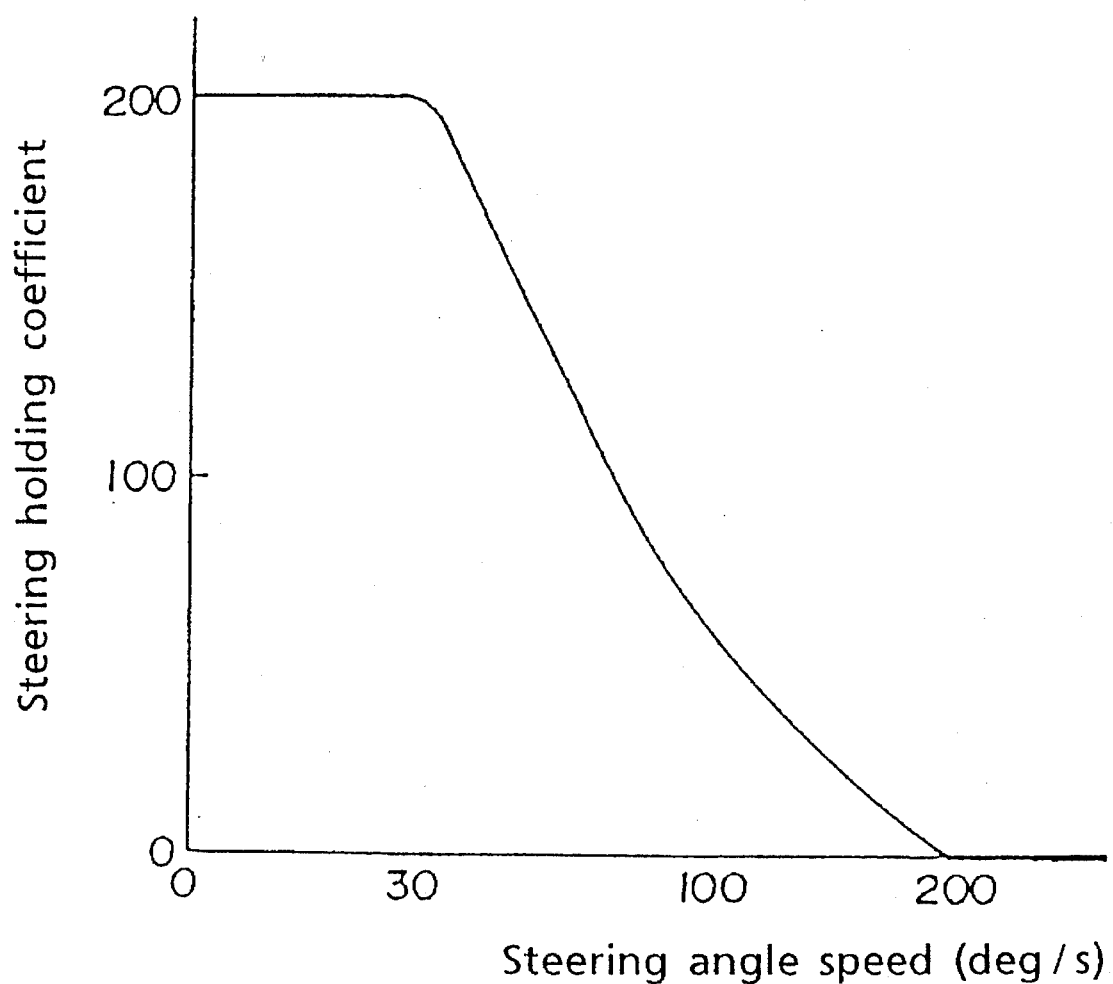
FIG. 15 is a function map of the steering holding coefficient vs. steering angular velocity.
Figure 16:
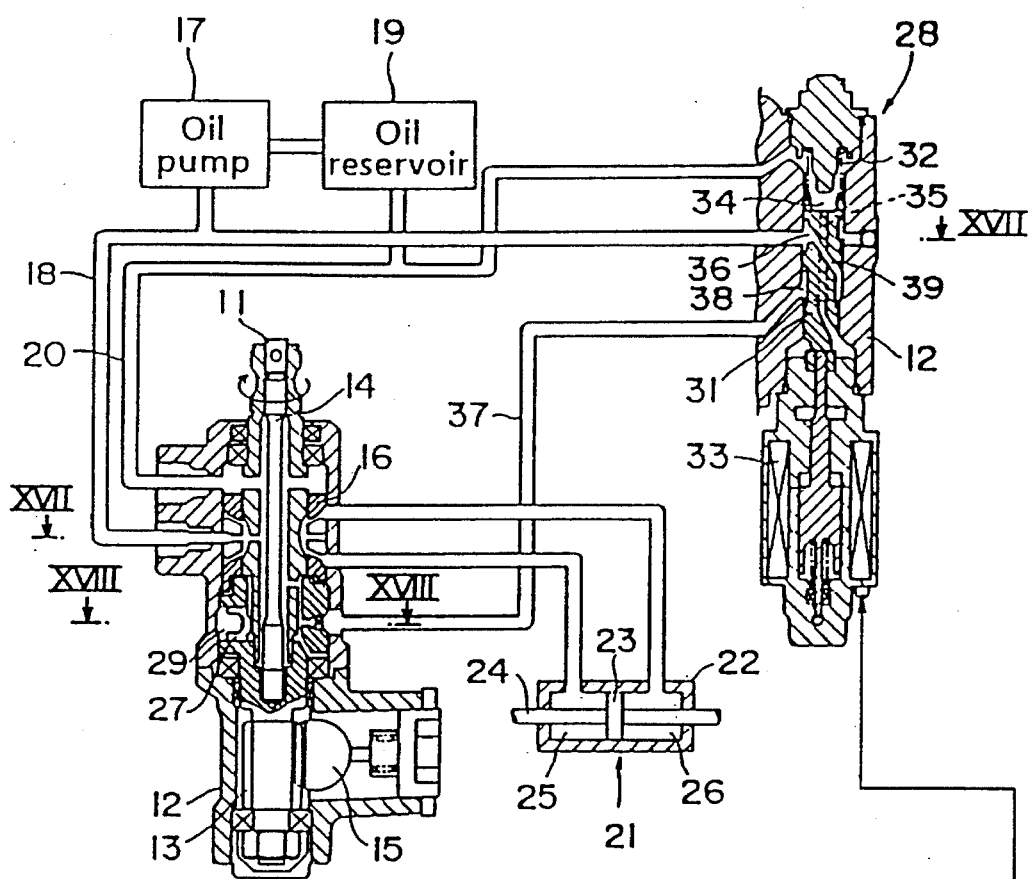
FIG. 16 is a schematic view showing structure of a hydraulic pressure control unit for power steering showing an example of a conventional electronically controlled power steering apparatus.
Figure 16:
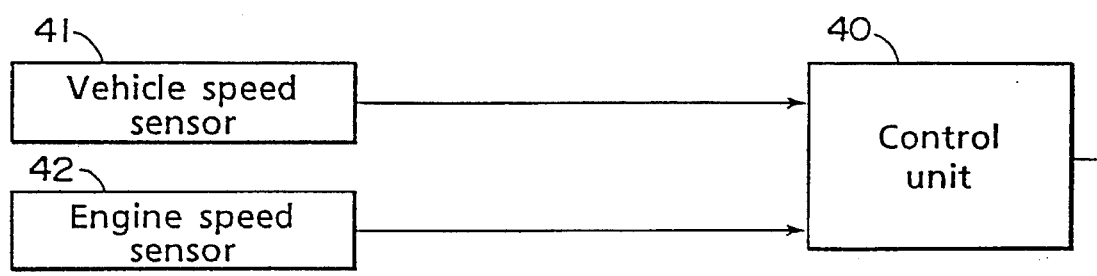
Figure 17:
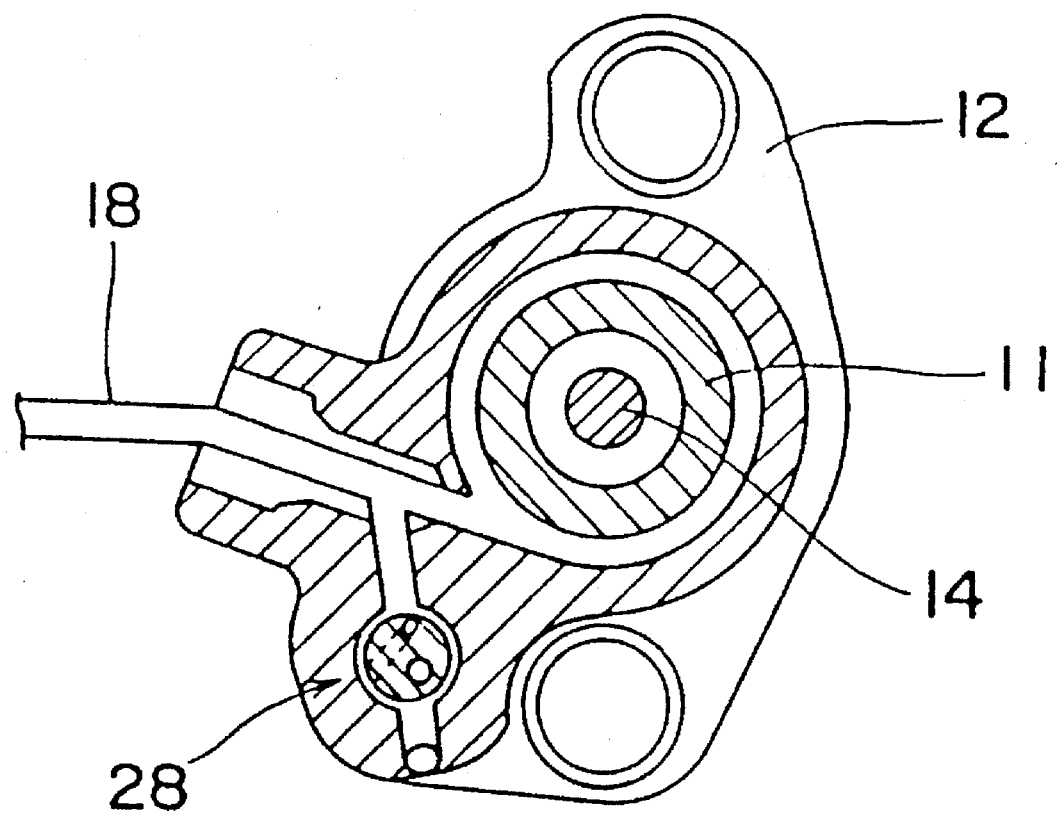
FIG. 17 is a schematic cross sectional view taken along line XVII—XVII in FIG. 16.
Figure 18:
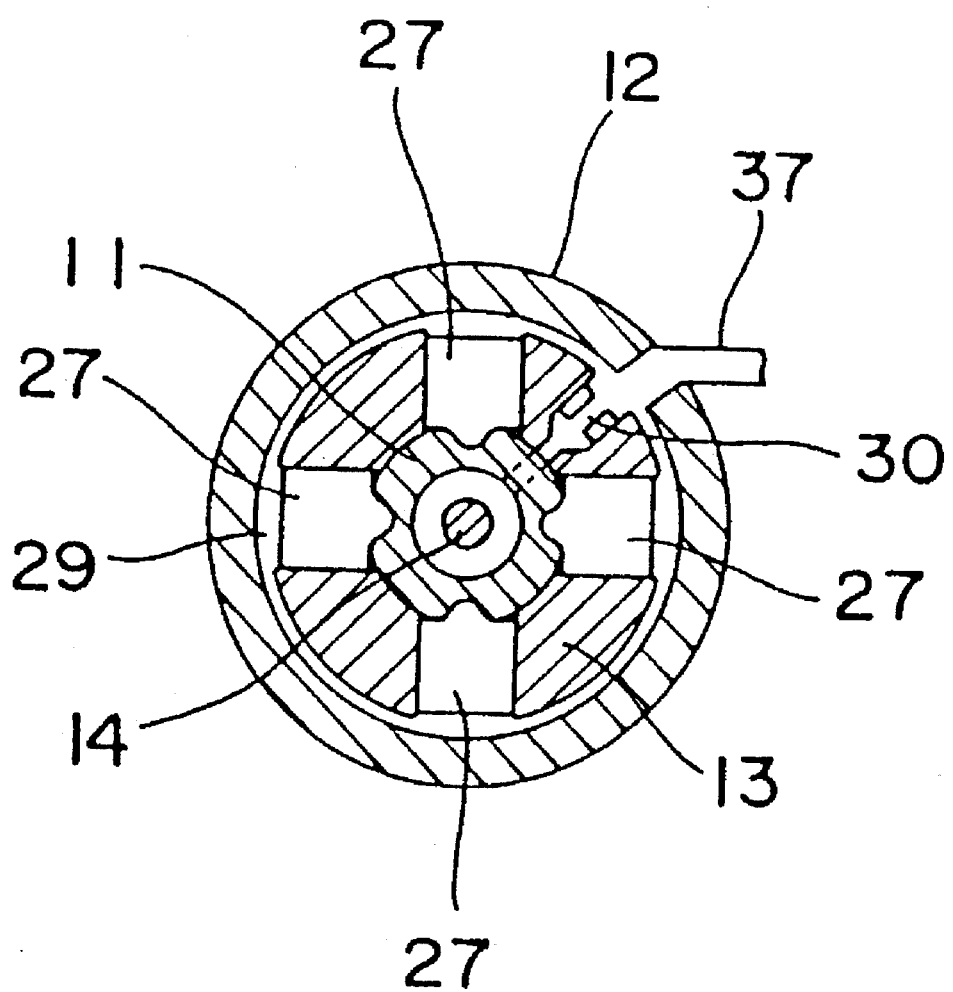
FIG. 18 is a schematic cross sectional view taken along line XVIII—XVIII in FIG. 16.

In the calculation flow chart of the steering holding coefficient $K_S$ by the steering holding degree calculation unit 54 described above, the steering holding release coefficient $K_1$ is calculated in step F8 using the predetermined equation. However, the setting method of the steering holding release coefficient $K_1$ is not limited to a predetermined equation. For example, a function map as shown in FIG. 15 may be used. The function map shown in FIG. 15 represents a graph of the steering holding release coefficient against the steering angular velocity, wherein the steering holding release coefficient is a fixed value of 200 for a steering angular velocity of 0 to 30 degrees/s, and the steering holding release coefficient decreases to 0 at 200 degrees/s for a steering angular velocity of not less than 30 degrees/s. Therefore, the steering holding degree calculation unit 54 of the CU 51 previously stores the function map and, in step F8 of the calculation flow chart of the steering holding coefficient $K_S$ of FIG. 11, the steering holding release coefficient against the steering angular velocity is determined using the function map.

Here, in the above-described electronically controlled power steering apparatus, the control procedure by the control unit 51 will be described with reference to the flow chart in FIG. 13.

Figure 13:
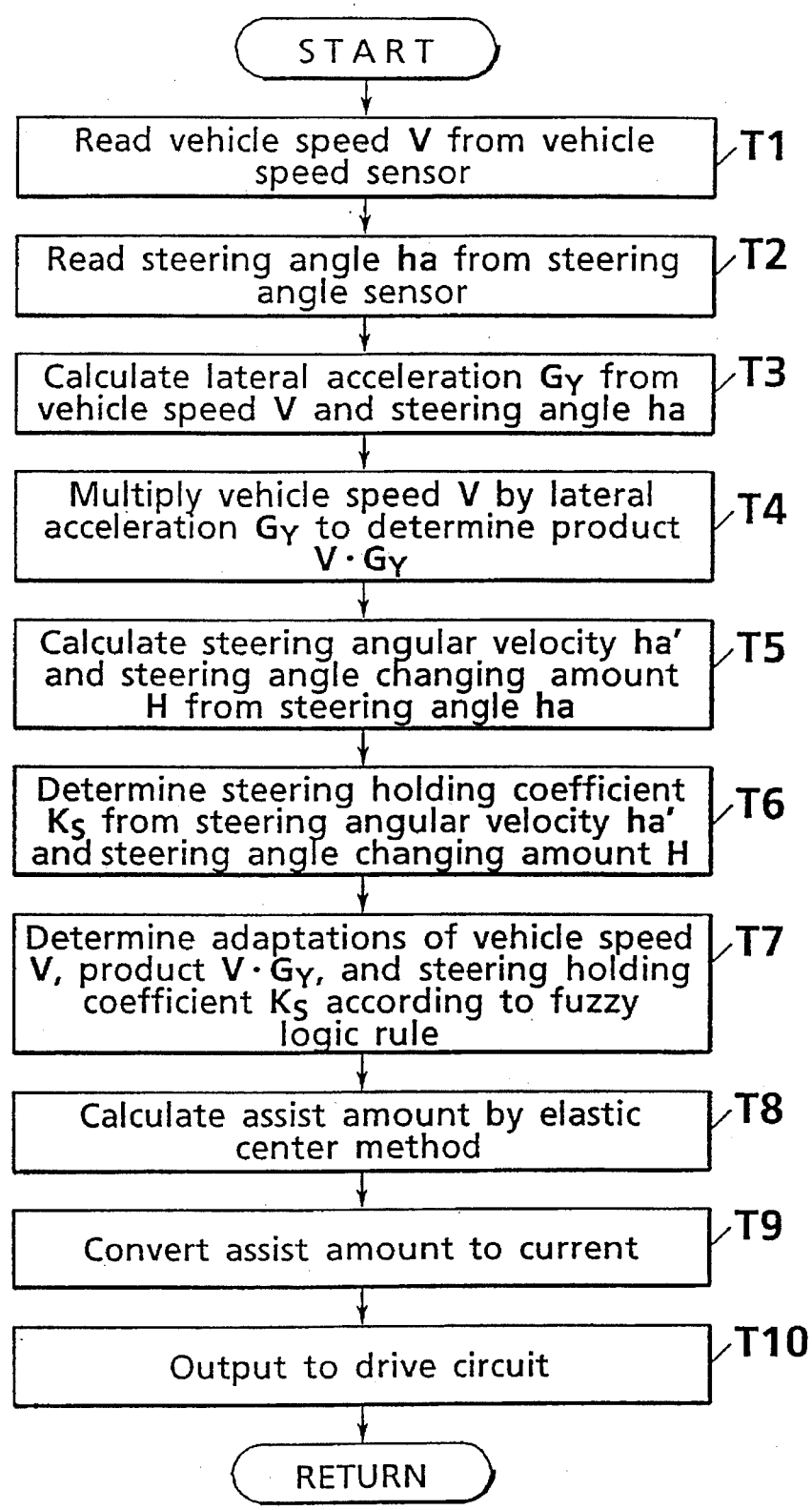
FIG. 13 is a flow chart showing fuzzy logic control.
Figure 14:
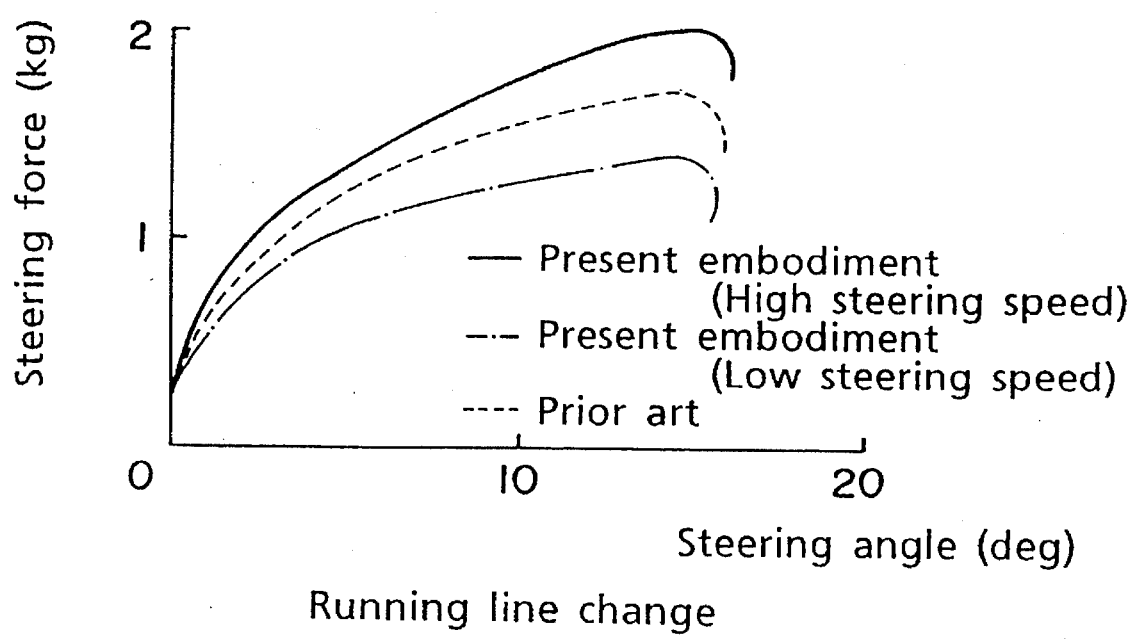
FIG. 14 is a graph regarding steering force vs. steering angle due to a difference in steering velocity in lane changing by fuzzy logic control of the present invention.

Referring to FIG. 13, first in step T1, the vehicle speed sensor 41 detects the running speed V of the vehicle, outputs the sensor signal of vehicle speed to the CU51 (lateral acceleration calculation unit 53 and the fuzzy logic calculation unit 55), and the processing proceeds to step T2. In step T2, the steering angle sensor 52 detects the steering angle ha of the vehicle, outputs the sensor signal of steering angle to the CU 51 (lateral acceleration calculation unit 53 and the steering holding degree calculation unit 54), and the processing proceeds to step T3. In step T3, the CU 51 converts analog signals as the sensor signals of the vehicle speed V and the steering angle ha to digital signals, and the lateral acceleration $G_Y$ acting upon the vehicle is calculated by the lateral acceleration calculation unit 53 in response to the vehicle speed V and the steering angle ha. Further, in step T4, the vehicle speed V is multiplied by the lateral acceleration $G_Y$ to obtain the product $V \cdot G_Y$.

In step TS, the steering angular velocity ha' and the steering angle changing amount H are calculated from the steering angle ha, and the processing proceeds to step T6. In step T6, the steering holding coefficient $K_S$ is determined From the steering angular velocity ha' and the steering angle changing amount H.

Then, in step T7, in the fuzzy logic calculation unit 55, the adaptation regarding the running condition of vehicle speed V is determined from the graph of membership function shown in FIG. 2, the adaptation regarding the running condition of the product $V \cdot G_Y$ is determined from the graph of membership function shown in FIG. 3, and the adaptation regarding the running condition of the steering holding coefficient $K_S$ is determined from the graph of membership function shown in FIG. 4. In step T8, the target steering assist amount is determined by the method of elastic center using the calculation graph shown in FIG. 5. Further, in step T9, the target steering assist amount is converted to the corresponding current to be applied to the solenoid 33 of the hydraulic pressure control valve 28. Finally, in step T10, the current for controlling the steering assist amount is outputted to the drive circuit, that is, the solenoid 33 of the hydraulic pressure control valve 28.

As described above, in the present embodiment, when the vehicle is running at a high speed, in general, the steering assist amount of power steering is decreased to make steering heavier since the vehicle speed V is high. However, at the time when the driver is in the steering holding condition at a minute steering angle without steering, the driver is required to use a large steering (steering holding) force which may be a heavy burden to the driver. Therefore, in the present embodiment, the steering holding coefficient $K_S$, according to the steering angular velocity ha' and the steering angle changing amount H of the steering mechanism, is applied as a membership function. With this arrangement, when the vehicle is running at a high speed, the steering holding coefficient $K_S$ is varied to increase the steering assist amount of power steering to make steering lighter than usual.

In the steering holding coefficient $K_S$, when a steering holding condition of the vehicle is determined, the steering holding coefficient $K_S$ is counted up one by one in response to the steering angular velocity ha' and the steering angle changing amount H of the steering mechanism, whereby the steering assist amount of the power steering is gradually increased to make steering slightly lighter than usual without the occurrence of an unusual feeling. On the other hand, when the driver steers for a predetermined amount to change the lane on an expressway, for example, and releases the steering holding condition, since the steering holding release coefficient $K_1$ is set in response to the steering angular velocity ha' of the steering mechanism by a predetermined calculation equation to substitute for the steering holding coefficient. $K_S$, the steering assist amount of power steering can be momentarily decreased to momentarily make steering force lighter than usual.

As described above, since, in the electronically controlled power steering apparatus of the present embodiment, the steering holding coefficient $K_S$ according to the steering annular velocity ha' and the steering angle changing amount H is applied as a membership function in addition to changes in the vehicle speed V, and the steering assist amount is controlled in accordance with a fuzzy logic rule using these membership functions, the steering assist amount is decreased to make steering heavier as the vehicle changes from low speed to high speed, thereby stabilizing the steering wheel. When the vehicle is running at a high speed in the steering holding condition, since the steering holding coefficient $K_S$ is high, the increasing rate of the steering assist amount is decreased to make steering lighter to this extent. Therefore, in the high speed steering holding condition, the driver is not required to use a large steering (steering holding) force and can easily operate the steering wheel.

Even when the vehicle is running on a cant road or the like with a steering angle ha of 1 to 3 degrees, the steering holding condition of the vehicle is required to determine the optimum steering assist amount in response to the steering holding coefficient $K_S$ to make steering lighter, and the driver is able to easily steer the steering wheel with a small steering holding force. Further, when the driver steers the steering wheel by a predetermined amount to change lanes while the vehicle is running on an expressway in the steering holding condition, the steering holding release coefficient $K_1$ is set from the steering angular velocity ha' according to a predetermined calculation equation to substitute for the steering holding coefficient $K_S$. Thus, the steering assist amount is momentarily decreased to momentarily make steering heavier in response to the driver's steering operation. This thereby allowing the driver to make stable steering operation for changing lanes.

When the electronically controlled power steering apparatus of the present embodiment is applied to a vehicle, the steering force versus the steering angle due to a difference in steering speed in changing lanes is as shown in the graph of FIG. 11. In FIG. 11, the solid line and the dot-bar line indicate the steering force of the electronically controlled power steering apparatus (EPS) of the present embodiment, wherein the solid line indicates a case where the steering speed is high, the dot-bar line indicates a case where the steering speed is low, and the dot line indicates the steering force of a conventional EPS. As shown in FIG. 11, in the EPS of the present embodiment, in changing lanes during high speed running, when the steering speed is high, the steering force is greater than in the case where the steering speed is low, thereby assuring the running stability. On the other hand, in the conventional EPS, the steering force is constant irrespective of the steering speed, producing a feeling heavy when steering slowly, and producing too light of a feeling when steering quickly.

In the above-described embodiment, the control system of the electronically controlled power steering apparatus is described as a hydraulic type, however, the present invention is not limited to the embodiment, but can also be applied to an electric power steering apparatus using a motor to achieve the same effect. Also, the mechanical system of the electronically controlled power steering apparatus is not limited to the embodiment, but the present invention can be applied to any type of power steering apparatus.

In the above-described embodiment, the control unit 51 is provided with the lateral acceleration calculation unit 53, which calculates the lateral acceleration $G_Y$ acting upon the vehicle in accordance with the vehicle speed V inputted from the vehicle speed sensor 41 and the steering angle ha inputted from the steering angle sensor 52. Alternatively, a lateral acceleration detection sensor may be provided on the vehicle to directly measure the lateral acceleration $G_Y$. Further, evaluation of the membership function regarding the product $V \cdot G_Y$ of the vehicle speed V and the lateral acceleration $G_Y$ and the steering assist amount is divided individually into three stages. However, it may be divided, for example, into five stages. The steering assist amount is determined by the elastic center method, but this may otherwise be determined using the maximum average method, the height method (skeleton method), or the area method, for example.

Further, while, in the embodiment described above, the target steering assist amount is set, in accordance with the fuzzy logic rule by the control unit (target assist amount setting means) 51, it may otherwise be set using some other control device.

As described above in detail with reference to the embodiment,, with the control system and control method for a power steering apparatus of the present invention, the steering force can be controlled according to the steering condition and steering holding condition to improve the steering feeling and, by using the steering holding coefficient according to the steering angular velocity is used as an input condition, steering operability when the vehicle is running at a high speed in the steering holding condition can be improved. As a result, an optimum steering characteristic can be obtained according to the running condition of the vehicle.

Further, since the steering assist amount is decreased as the vehicle speed increases, steering becomes heavier as the vehicle speed increases to stabilize the steering operability. Since the target steering assist amount is increased as the steering holding coefficient increases, steering becomes lighter when the vehicle is running, for example, on a cant, road, in the steering holding condition, thereby improving the steering operability. As a result, fine steering control is possible with a reduced number of fuzzy logic rules, thereby obtaining steering feeling with well-balanced stability and operability according to the steering holding condition.

Further, when the vehicle is in the steering holding condition, the steering assist amount is gradually increased to make steering lighter and improve the steering operability. Further, when the steering holding condition is released, the steering assist amount is momentarily decreased to make steering heavier and improve the steering stability, thereby obtaining an optimum high speed steering characteristic.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control system for a power steering apparatus for controlling a steering assist amount of a steering mechanism of a vehicle to a target steering assist amount, comprising:

steering angle detection means for detecting a steering angle of the steering mechanism;

steering angular velocity detection means for detecting a steering angular velocity of the steering mechanism; and a controller for increasing the target steering assist amount when the detected steering angular velocity is smaller than a first predetermined value and a total amount of change of the detected steering angle over a predetermined period of time, is smaller than a second predetermined value.

2. The control system for a power steering apparatus of claim 1, wherein said controller increases a steering holding coefficient, corresponding to a degree of non-movement of the steering mechanism, when the detected steering angular velocity is smaller than the first predetermined value and the total amount of change of the detected steering angle over a predetermined period of time, is smaller than the second predetermined value, wherein the target steering assist amount is increased in response to an increase in the steering holding coefficient.

3. The control system for a power steering apparatus of claim 2 further comprising:

lateral acceleration detection means for determining a lateral acceleration acting upon the vehicle, wherein said controller decreases the steering holding coefficient when the determined lateral acceleration is greater than a third predetermined value and the detected steering angular velocity is greater than a fourth predetermined value.

4. The control system for a power steering apparatus of claim 3, wherein said controller increases the steering holding coefficient by adding a preset value to the steering holding coefficient each time the detected steering angular velocity is determined to be smaller than the first predetermined value and the total amount of change of the detected steering angle over a predetermined period of time, is determined to be smaller than the second predetermined value, and decreases the steering holding coefficient by subtracting a value greater than the preset value from the steering holding coefficient each time the determined lateral acceleration is determined to be greater than the third predetermined value and the detected steering angular velocity is determined to be greater than the fourth predetermined value.

5. The control system for a power steering apparatus of claim 2, wherein said controller generates a steering holding release coefficient, decreased in response to an increase in the detected steering angular velocity, wherein the steering holding release coefficient is substituted for the steering holding coefficient when the steering holding release coefficient is determined to be smaller than the steering holding coefficient.

6. The control system for a power steering apparatus of claim 5, wherein said controller generates the steering holding release coefficient by dividing a fifth predetermined value by the square of the detected steering angular velocity.

7. The control system for a power steering apparatus of claim 5, wherein said controller generates the steering holding release coefficient from a stored function map, based upon the detected steering angular velocity.

8. The control system for a power steering apparatus of claim 2 further comprising:

vehicle speed detection means for detecting a vehicle speed, wherein said controller decreases the target steering assist amount, based upon a first fuzzy logic rule, as the detected vehicle speed increases and increases the target steering assist amount, based upon a second fuzzy logic rule, as the steering holding coefficient increases.

9. The control system for a power steering apparatus of claim 2 further comprising:

vehicle speed detection means for detecting a vehicle speed; and lateral acceleration detection means for determining a lateral acceleration acting upon the vehicle;

wherein said controller calculates a product of the detected vehicle speed and the determined lateral acceleration, and decreases the target steering assist amount, based upon a third fuzzy logic rule, as the calculated product increases and increases the target steering assist amount, based upon a fourth fuzzy logic rule, as the steering holding coefficient increases.

10. A control method for a power steering apparatus for controlling a steering assist amount of a steering mechanism of a vehicle to a target steering assist amount, comprising the steps of:

(a) detecting a steering angle of the steering mechanism;

(b) obtaining a steering angular velocity;

(c) generating a total amount of change of the detected steering angle over a predetermined period of time; and (d) increasing the target steering assist amount when the steering angular velocity of step (b) is smaller than a first predetermined value and the generated total amount of change of step (c) is smaller than a second predetermined value.

11. The control method for a power steering apparatus of claim 10, further comprising the step of:

(e) increasing a steering holding coefficient, corresponding to a degree of non-movement of the steering mechanism, when the obtained steering angular velocity of step (b) is smaller than the first predetermined value and the total amount of change of step (c) is smaller than the second predetermined value, wherein the target steering assist amount is increased in step (d) according to an increase in the steering holding coefficient.

12. The control method for a power steering apparatus of claim 11, further comprising the steps of:

(f) determining a lateral acceleration acting upon the vehicle; and (g) decreasing the steering holding coefficient when the determined lateral acceleration of step (f) is greater than a third predetermined value and the obtained steering angular velocity of step (b) is greater than a fourth predetermined value.

13. The control method for a power steering apparatus of claim 12, further comprising the steps of:

(h) increasing the steering holding coefficient by adding a preset value to the steering holding coefficient each time the obtained steering angular velocity of step (b) is determined to be smaller than the first predetermined value and the total amount of change of the detected steering angle of step (c) over a predetermined period of time, is determined to be smaller than the second predetermined value; and (i) decreasing the steering holding coefficient by subtracting a value greater than the preset value from the steering holding coefficient each time the determined lateral acceleration of step (f) is determined to be greater than the third predetermined value and the detected steering angular velocity of step (b) is determined to be greater than the fourth predetermined value.

14. The control method for a power steering apparatus of claim 11, further comprising the steps of:

(f) generating a steering holding release coefficient, decreased in response to an increase in the obtained steering angular velocity of step (b); and (g) substituting the steering holding release coefficient for the steering holding coefficient when the steering holding release coefficient is determined to be smaller than the steering holding coefficient.

15. The control method for a power steering apparatus of claim 14, further comprising the step of:

(h) generating the steering holding release coefficient by dividing a fifth predetermined value by the square of the obtained steering angular velocity of step (b).

16. The control method for a power steering apparatus of claim 14, further comprising the step of:

(h) generating the steering holding release coefficient from a stored function map, based upon the obtained steering angular velocity.

17. The control method for a power steering apparatus of claim 11, further comprising the steps of:

(f) detecting vehicle speed;

(g) calculating a steering holding coefficient;

(h) decreasing the target steering assist amount, based upon a first fuzzy logic rule, as the detected vehicle speed increases; and (i) increasing the target steering assist amount, based upon a second fuzzy logic rule, as the steering holding coefficient increases.

18. The control method for a power steering apparatus of claim 11, further comprising the steps of:

(f) detecting vehicle speed;

(g) determining a lateral acceleration acting upon the vehicle;

(h) calculating a steering holding coefficient;

(i) calculating a product of the detected vehicle speed and the determined lateral acceleration;

(j) decreasing the target steering assist amount, based upon a third fuzzy logic rule, as the calculated product of step (i) increases; and (k) increasing the target steering assist amount, based upon a fourth fuzy logic rule, as the calculated steering holding coefficient of step (h) increases.

19. A control system for a power steering apparatus for controlling a steering assist amount of a steering mechanism of a vehicle to a target steering assist amount, comprising:

steering angular velocity detection means for detecting a steering angular velocity of the steering mechanism;

lateral acceleration detecting means for determining a lateral acceleration acting upon the vehicle; and a controller for decreasing the target steering assist amount when the detected steering angular velocity is greater than a first predetermined value and the determined lateral acceleration is greater than a second predetermined value.

20. The control system of claim 19, wherein the controller decreases a steering holding coefficient, corresponding to a degree of non-movement of the steering mechanism, when the detected steering angular velocity is greater than the first predetermined value and the determined lateral acceleration is less than the second predetermined value, the target steering assist amount being decreased in response to a decrease in the steering holding coefficient.

21. The control system for a power steering apparatus for controlling a steering assist amount of a steering mechanism of a vehicle to a target steering assist amount, comprising:

steering angular velocity detection means for detecting a steering angular velocity of the steering mechanism; and a controller for generating a steering holding release coefficient, by dividing a first predetermined value by the square of the detected steering angular velocity, the controller decreasing the target steering assist amount when the steering holding release coefficient is less than a steering holding coefficient, corresponding to a degree of non-movement of the steering mechanism.

22. The control system of claim 21, wherein the controller decreases the steering holding coefficient to equal the steering holding release coefficient when the steering holding release coefficient is less than the steering holding coefficient, the target steering assist amount being decreased in response to a decrease in the steering holding coefficient.

23. A control method for a power steering apparatus for controlling a steering assist amount of a steering mechanism of a vehicle to a target steering assist amount, comprising the steps of:

(a) detecting a steering angular velocity of the steering mechanism;

(b) determining a lateral acceleration acting upon the vehicle; and (c) decreasing the target steering assist amount when the detected steering angular velocity is greater than a first predetermined value and the determined lateral acceleration is greater than a second predetermined value.

24. The control method of claim 23, further comprising the step of:

(d) decreasing a steering holding coefficient, corresponding to a degree of non-movement of the steering mechanism, when the detected steering angular velocity is greater than a first predetermined value and the determined lateral acceleration is less than the second predetermined value, the target steering assist amount being decreased in step (c) in response to a decrease in the steering holding coefficient in step (d).

25. The control method for a power steering apparatus for controlling a steering assist amount of a steering mechanism of a vehicle to a target steering assist amount, comprising the steps of:

(a) detecting a steering angular velocity of the steering mechanism;

(b) generating a steering holding release coefficient by dividing a first predetermined value by the square of the detected steering angular velocity; and (c) decreasing the target steering assist amount when the steering holding release coefficient is less than a steering holding coefficient, corresponding to a degree of non-movement of the steering mechanism.

26. The control method of claim 25, further comprising the step of:

(d) decreasing the steering holding coefficient to equal the steering holding release coefficient when the steering holding release coefficient is less than the steering holding coefficient, the target steering assist amount being decreased in response to a decrease in the steering holding coefficient in step (d).

* * * * *